(12) United States Patent
Light et al.

(10) Patent No.: US 7,778,207 B2
(45) Date of Patent: *Aug. 17, 2010

(54) PASSIVE TAP AND ASSOCIATED SYSTEM FOR TAPPING NETWORK DATA

(76) Inventors: Greta L. Light, 214 42$^{nd}$ Ave., San Mateo, CA (US) 94403; James D. McVey, 1135 Greenwood Ave., Palo Alto, CA (US) 94301-3411; N. Anders Olsson, 2450 Bridle Path Ct., Gilroy, CA (US) 95020; A. Michael Lawson, 1385 James Ct., Morgan Hill, CA (US) 95037; Paul R. Gentieu, 999 Belmont Terr. #3, Sunnyvale, CA (US) 94086

( * ) Notice: Subject to any disclaimer, the term of this patent is extended or adjusted under 35 U.S.C. 154(b) by 766 days.

This patent is subject to a terminal disclaimer.

(21) Appl. No.: 11/560,341

(22) Filed: Nov. 15, 2006

(65) Prior Publication Data

US 2007/0171966 A1 Jul. 26, 2007

Related U.S. Application Data

(60) Provisional application No. 60/737,240, filed on Nov. 15, 2005, provisional application No. 60/739,879, filed on Nov. 23, 2005, provisional application No. 60/739,513, filed on Nov. 23, 2005, provisional application No. 60/739,649, filed on Nov. 23, 2005, provisional application No. 60/739,512, filed on Nov. 23, 2005, provisional application No. 60/739,648, filed on Nov. 23, 2005, provisional application No. 60/753,348, filed on Dec. 22, 2005, provisional application No. 60/771,932, filed on Feb. 9, 2006.

(51) Int. Cl.
*H04L 5/14* (2006.01)

(52) U.S. Cl. .................................... 370/276

(58) Field of Classification Search ............... 370/250, 370/246, 247, 252, 235, 242, 248, 228, 241, 370/216, 249, 236, 237, 238, 276; 375/232; 709/224, 239, 230; 379/325, 326, 329, 32.01; 361/690, 687, 695, 694

See application file for complete search history.

(56) References Cited

U.S. PATENT DOCUMENTS 6,785,908 B1 * 8/2004 Kamiya .................... 725/149

(Continued)

FOREIGN PATENT DOCUMENTS

WO 2007/059509 A2 5/2007

OTHER PUBLICATIONS

Texas Instruments, "Integrated 100-V IEEE 802.3af PD and DC/DC Controller," SLV5590A, Aug. 2005, 38 pages.

(Continued)

*Primary Examiner*—Chi H Pham
*Assistant Examiner*—Alexander Boakye

(57) ABSTRACT

A network tap device array including one or more passive full-duplex bidirectional ZPL network tap devices is disclosed. The array enables data from multiple nodes in a communications network to be tapped and forwarded to a plurality of monitoring devices. In one embodiment the network tap device array includes a chassis that is configured to receive a plurality of passive full-duplex bidirectional ZPL network tap devices. Each passive full-duplex bidirectional ZPL network tap device includes network ports for passing network data via communication cables and tap ports for forwarding the tapped network data to the monitoring device. In another embodiment, a sub-chassis includes a plurality of passive full-duplex bidirectional ZPL network tap devices and an aggregator that aggregates tapped data from each of the tap devices. The aggregator then forwards the aggregated data to the monitoring device. The sub-chassis can be included in a chassis that is configured to receive multiple populated chassis.

25 Claims, 16 Drawing Sheets

U.S. PATENT DOCUMENTS

| | | | |
|---|---|---|---|
| 6,816,590 B2 * | 11/2004 | Pike et al. | 379/329 |
| 6,868,069 B2 * | 3/2005 | Knobbe et al. | 370/252 |
| 7,373,528 B2 | 5/2008 | Schindler | |
| 7,486,624 B2 * | 2/2009 | Shaw et al. | 370/242 |
| 7,548,515 B2 * | 6/2009 | Walsh | 370/241 |
| 7,561,517 B2 * | 7/2009 | Klinker et al. | 370/235 |
| 2003/0072438 A1 | 4/2003 | Le Creff et al. | |
| 2004/0120259 A1 * | 6/2004 | Jones et al. | 370/250 |
| 2004/0215832 A1 | 10/2004 | Gordy et al. | |
| 2004/0228090 A1 | 11/2004 | Blackwell | |
| 2005/0041684 A1 | 2/2005 | Reynolds et al. | |
| 2005/0071711 A1 | 3/2005 | Shaw | |
| 2005/0129033 A1 | 6/2005 | Gordy et al. | |
| 2005/0147082 A1 | 7/2005 | Keddy et al. | |
| 2005/0222815 A1 | 10/2005 | Tolly | |
| 2005/0257262 A1 | 11/2005 | Matityahu et al. | |
| 2005/0281326 A1 | 12/2005 | Yu | |
| 2006/0063509 A1 | 3/2006 | Pincu et al. | |
| 2006/0153092 A1 | 7/2006 | Matityahu et al. | |
| 2006/0233115 A1 | 10/2006 | Matityahu et al. | |
| 2007/0081549 A1 * | 4/2007 | Cicchetti et al. | 370/447 |
| 2007/0081553 A1 | 4/2007 | Cicchetti et al. | |
| 2007/0174492 A1 | 7/2007 | Light et al. | |
| 2007/0253349 A1 | 11/2007 | Light et al. | |
| 2008/0013467 A1 | 1/2008 | Light et al. | |
| 2008/0014879 A1 | 1/2008 | Light et al. | |

OTHER PUBLICATIONS

Texas Instruments, "10-W Power-Over-Ethernet Isolated Power Module Assembly," SLT5224B, Jul. 2004, 11 pages.
U.S. Appl. No. 11/776,286, Oct. 1, 2009, Office Action.
U.S. Appl. No. 11/421,372, Feb. 4, 2009, Office Action.
U.S. Appl. No. 11/421,372, Oct. 26, 2009, Final Office Action.
U.S. Appl. No. 11/421,361, Feb. 17, 2009, Office Action.
U.S. Appl. No. 11/421,361, Nov. 24, 2009, Final Office Action.
U.S. Appl. No. 11/421,372, Jan. 29, 2010, Office Action.
U.S. Appl. No. 11/421,361, Feb. 2, 2010, Office Action.
U.S. Appl. No. 11/776,286, Feb. 17, 2010, Notice of Allowance.

* cited by examiner

PASSIVE TAP AND ASSOCIATED SYSTEM FOR TAPPING NETWORK DATA

CROSS-REFERENCE TO RELATED APPLICATIONS

This application claims the benefit of U.S. Provisional Application No. 60/737,240, filed Nov. 15, 2005, U.S. Provisional Application No. 60/739,879, filed Nov. 23, 2005, U.S. Provisional Application No. 60/739,513, filed Nov. 23, 2005, U.S. Provisional Application No. 60/739,649, filed Nov. 23, 2005, U.S. Provisional Application No. 60/739,512, filed Nov. 23, 2005, U.S. Provisional Application No. 60/739,648, filed Nov. 23, 2005, U.S. Provisional Application No. 60/753,348, filed Dec. 22, 2005, and U.S. Provisional Application No. 60/771,932, filed Feb. 9, 2006, all of which are incorporated herein by reference in their entirety.

BACKGROUND

The dependence upon the use of data networks to transmit and receive data at high data rates has led to a corresponding interest in the ability to perform real-time monitoring and analysis of that data, or network traffic, so that duplication of data as well as performance of the network can be evaluated, and problems identified and resolved. Such data monitoring and analysis necessitates the ability to access the network data stream without disrupting data transmission and the operation of the network.

To this end, monitoring systems utilizing network taps are employed which are configured so that network data can be captured for analysis without interrupting operation of the network. In general, such use various mechanisms to access network data. For example, some taps include a buffering mechanism that enables the capture of network data. In other cases, network taps are able to copy selected portions of the data stream, and then provide the copied portion of the data stream to a network analyzer or other device for evaluation.

Referring to FIG. 1, a conventional copper-based Ethernet monitoring system 100 is illustrated. For example, an Ethernet device 101 is shown as being in communication with an Ethernet device 102 using standard Cat5 network cable. As per the Gigabit Ethernet standard, the communication on the twisted pair cable is bi-directional as is depicted by arrows 110 and 111.

Also illustrated is a tap 120 which is situated in the communication path between Ethernet devices 101 and 102. Tap 120 is used to access the data signals for monitoring. The tap includes relays 121 and 122 that can direct the signal path flow.

Further included in system 100 are four Physical Interface Devices (Phys) 131-134. These Phys may be individuals or contained in two dual or one 130 quad IC package as shown. The Phys provide the physical connection between the copper Cat5 cable and the communication network.

In operation, when it is desirable to monitor the data flow between Ethernet devices 101 and 102, the relays 121 and 122 of tap 120 are energized causing the flow of information between Ethernet devices 101 and 102 to be redirected to Phys 132 and 133. For example, energized relay 121 causes the data from device A 101, referred to as A data, to flow to Phy 132. Phy 132 sends the A data signal to Phy 131, where it is provided to monitor A for monitoring and to Phy 133, which provides the A data to energized relay 122 and device B 102. In like manner, energized relay 122 causes data from device B 102, referred to as B data, to flow to Phy 133. Phy 133 sends the B data signal to Phy 134, where it is provided to monitor B for monitoring and to Phy 132, which provides the B data to energized relay 121 and device A 101. Accordingly, system 100, utilizing a tap 120 with a combination of relays 121, 122 and quad Phy 130, is able to monitor the communication between Ethernet devices A 101 and B 102 while still allowing the devices to communicate bi-directionally.

While system 100 has generally proven to be useful in enabling the monitoring and analysis of network traffic, significant problems remain with this conventional system. One problem of particular concern is that network tap 120 is often susceptible to a power loss or other fault conditions. For example, the external power supply to the network tap is a significant failure point in the system. Unfortunately, disconnection of such external power supplies is a relatively common occurrence. In many cases, disconnection of the external power supply to the network tap occurs because the network tap and power supply are located in a place where personnel may inadvertently, or mistakenly, unplug the power supply. These challenges are only magnified where multiple network taps are implemented in the communication network or other system.

Any loss of power or other fault typically causes relays 121 and 122 to close. Consequently, any A data and B data that would have passed through the relays 121 and 122 during the switching operation is lost. Also, any data that is in tap 120 and the quad Phy 130 when power is interrupted is also lost. In addition, Ethernet devices 101 and 102 must reconfigure themselves to properly communicate, which also disrupts network data flow. In view of the high data speeds employed in many networks, even a very short term interruption in power to the network tap 120 will seriously compromise the integrity of the data stream, so that even if the network is otherwise in operational condition, an interruption of power to the network tap and the resulting loss of data can severely impair operation of the network. This lack of fault tolerance in many high speed data communication network taps is a major concern that remains largely unaddressed.

BRIEF SUMMARY

The principles of the present invention relate to a passive full-duplex bidirectional Zero Packet Loss (ZPL) network tap coupled to the communication path of a copper-based full-duplex bidirectional communications network including first and second devices. The first and second devices communicate by use of a data stream including first and second components. The principles of the present invention are also directed to chassis systems including one or more passive full-duplex bidirectional ZPL taps.

The passive full-duplex bidirectional ZPL network taps include first and second network ports configured to operably connect with first communication cables, the first communication cables configured to carry the data stream to and from the network tap device. First and second tap ports configured to operably connect with second communication cables may also be included.

The passive fall-duplex bidirectional ZPL network taps further include a signal separator having a first node connected to the first network port and a second node connected to the second network port. The signal separator is configured to receive the data stream from at least one of the first or second network port and pass through the data stream to the network port not providing the data stream. The signal separator is further configured to obtain while passing through the data stream a first signal portion substantially comprising the first signal component and a second signal portion substantially comprising the second signal component.

The passive full-duplex bidirectional ZPL network taps also includes a first receive only physical interface device (Phy) configured to receive the first signal portion from the signal separator and provide the first portion to the first tap port and a second receive only Phy configured to receive the second signal portion from the signal separator and provide the second signal portion to the second tap port.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
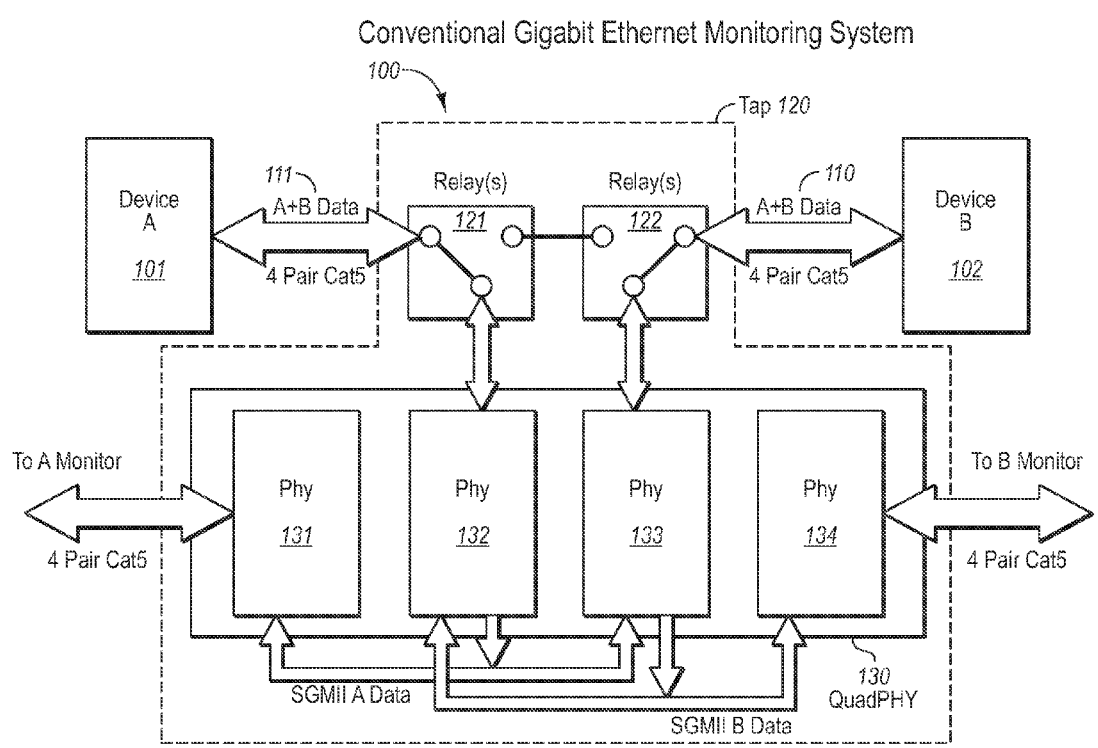
FIG. 1 illustrates a conventional copper based Ethernet monitoring system.

As disclosed in this description, and in the accompanying drawings which are also included as part of the present disclosure, embodiments of the present invention are concerned with passive full-duplex bidirectional Zero Packet Loss (ZPL) network taps (also hereinafter referred to as a "ZPL" tap) and associated devices, hardware and software in connection with copper-based Ethernet networks and other communications networks. Among other things, the passive full-duplex bidirectional ZPL network tap eliminates potential network data loss due to power loss or other fault in the ZPL tap, which contributes to a relative improvement in the reliability and operation of the network.

One example of such a passive full-duplex bidirectional ZPL network tap is configured for use with communications networks wherein two network devices communicate using bidirectional full-duplex data signals, such as, but not limited to, point to point Ethernet networks employing data rates, including, but not limited to, 10/100/1000 Mbit/sec., or even faster rates. More generally however, embodiments of the invention are suited for operation with any network where data is carried over the network lines. Accordingly, the scope of the invention should not be construed to be limited to any specific network type or data rate.

Further, it should be noted that unlike conventional taps, which use relays with physical switches as described previously, exemplary passive full-duplex bidirectional ZPL network taps of the invention do not include any active components positioned in-line with a network cable that could cause data packet loss or otherwise cause users on either end of the network link to be aware of the fact that data is being accessed by a ZPL tap. In other words, regardless of power loss or other fault to the passive full-duplex bidirectional ZPL network tap, there is no loss of communication between devices communicating over the network.

Additionally, some embodiments of the passive full-duplex bidirectional ZPL network tap are employed in a stand-alone configuration where the passive full-duplex bidirectional ZPL network tap obtains data from the network and then passes the data to a remote, or external, device such as an analyzer, bit error rate tester ("BERT") and/or other device. In yet other implementations however, the passive full-duplex bidirectional ZPL network tap is incorporated into another device, such as a portable analyzer for example. Thus, embodiments of the invention embrace portable analyzers and other devices that incorporate a passive full-duplex bidirectional ZPL network tap. In still further embodiments, a group of passive full-duplex bidirectional ZPL network taps are incorporated together into a bank, block or similar configuration so that the network data stream can be tapped and directed to multiple devices by way of respective ZPL taps. Such banks or blocks can be configured in serial or parallel fashion.

Of course, the scope of the invention is not limited to data communications network applications. By way of example, embodiments of the passive full-duplex bidirectional ZPL network tap are suitable for use in Voice Over Internet Protocol ("Voice Over IP") systems and applications. Yet other embodiments are employed in monitoring telephone lines. As mentioned, exemplary bidirectional passive full-duplex bidirectional ZPL network taps are configured such that users on either end of the network link are unaware of the fact that data is being accessed by a tap. This feature is particularly useful for governmental agencies or other entities that are authorized to access network data for the purposes of monitoring and surveillance of communications.

Embodiments of the passive full-duplex bidirectional ZPL network tap include a variety of components which enable the network tap to implement network data stream tap functionality. More particular details concerning such components and their functionalities and operations are provided below in connection with the discussion of FIG. 2. An example copper-based Ethernet monitoring system in which a passive full-duplex bidirectional ZPL network tap may be employed will first be described, followed by aspects of an example passive full-duplex bidirectional ZPL network tap. Note that the principles of the present invention are not limited to any specific environment.

I. Example Copper-Based Ethernet Monitoring System Employing a ZPL Tap

Figure 2:
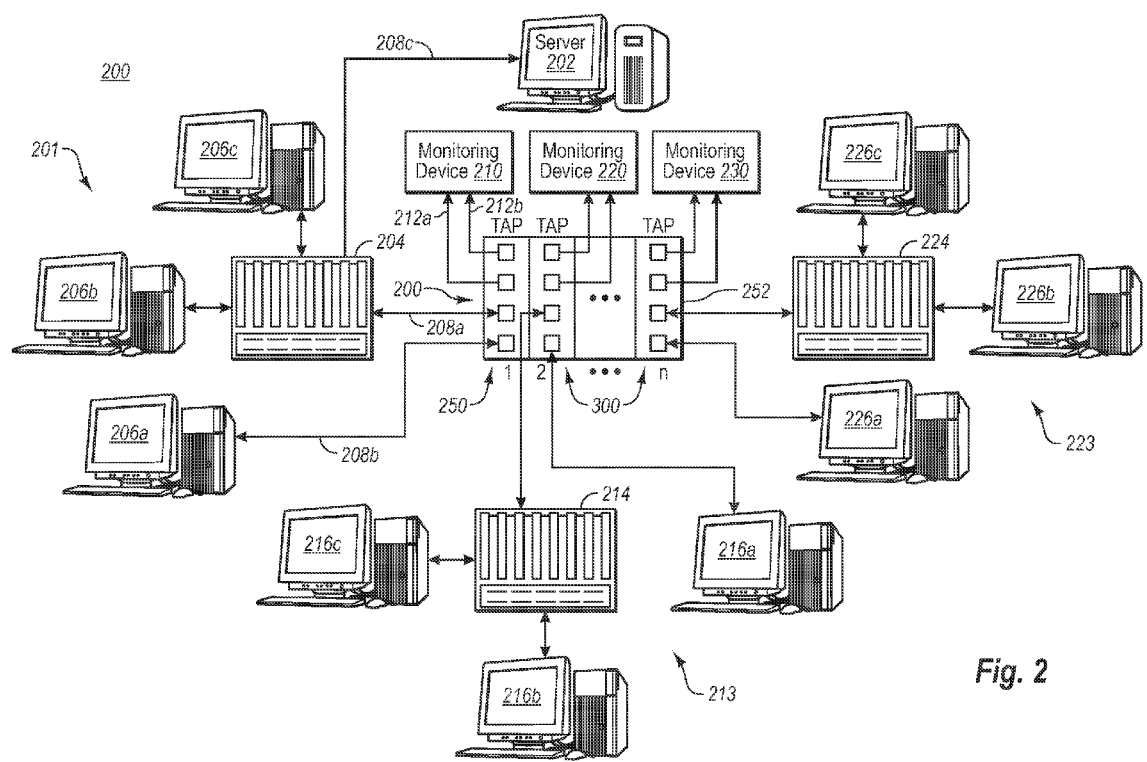
FIG. 2 illustrates a communications network including passive fall-duplex bidirectional ZPL network tap array.

Reference is now made to FIG. 2, which depicts one example of an operating environment in which passive full-duplex bidirectional ZPL network tap can be utilized, in accordance with one example embodiment of the present invention. Alternatively, the environment depicted in FIG. 2 can also represent an environment in which a passive full-duplex bidirectional ZPL network Tap and Aggregator of embodiments of the present invention can be included, as discussed further below.

In particular, FIG. 2 shows a block diagram of a communications network, or computer network 200, including a passive full-duplex bidirectional ZPL network tap array ("ZPL tap array"), generally designated at 250, in accordance with one embodiment of the present invention. Although computer network 200 was selected to illustrate the present invention, any computer network topology can be used with the present invention, including but not limited to various combinations of network servers, switches, routers, hubs and various end user computers/terminals. Indeed, various modifications to both the passive full-duplex bidirectional ZPL network tap array and its operating environment can be realized while still residing within the scope of the present claimed invention. Hereinafter, individual elements forming a group of like elements may also be referred to by a letter designation.

In greater detail, the computer network 200, in a selected network segment 201, generally includes a network server 202, a network switch 204 (e.g., a router), desktop computers 206a-c, and the passive full-duplex bidirectional ZPL network tap array 250. The ZPL tap array 250 includes a chassis 252 that contains a plurality n of bidirectional full-duplex ZPL tap devices 300.

The network server 202, the desktop computers 206b,c and the passive full-duplex bidirectional ZPL network tap 300 are coupled directly to the network switch 204. The passive full-duplex bidirectional ZPL network tap 300 is coupled between the network switch 204 and the desktop computer 206a via cables 208a, b. The passive full-duplex bidirectional ZPL network tap 300 is further coupled to a monitoring device 210 via cables 212a,b. For Gigabit Ethernet, the cables 208 and 212 are typically four-pair Cat5 twisted-pair cables, but the passive full-duplex bidirectional ZPL network tap 300 can also work with 10BASE-T and 100BASE-T Ethernet systems, which typically use Category 3 (Cat3) cables, or with other suitable transmission lines. The passive full-duplex bidirectional ZPL network tap 300 can be programmed to operate with multiple Ethernet speeds and cables using an onboard microprocessor, discussed further below, or by setting jumpers and/or switches in the passive full-duplex bidirectional ZPL network tap. Similarly, the other n passive full-duplex bidirectional ZPL network tap devices 300 are operably coupled to corresponding monitoring devices, such as the monitoring devices 220 and 230 shown in FIG. 2, and their operation with regard to their respective monitoring devices is as described below with respect to the ZPL tap 300 and monitoring device 210. In one embodiment each passive full-duplex bidirectional ZPL network tap device is coupled to only one monitoring device; in other embodiments, one monitoring device is coupled to more than one ZPL tap device. The term "monitoring device" as used herein is understood to include a network analyzer or other diagnostic equipment, intrusion detection system, or any other device used to monitor and/or analyze the operational status or data content of a computer network segment.

In a typical network session, the desktop computer 206a requests from the network server 202 a file containing information needed by an application program executing on the desktop computer 206a. The desktop computer 206a issues a request to the network server 202, which propagates through the passive full-duplex bidirectional ZPL network tap 300 to the network switch 204 via cables 208a, b. The network switch 204 reviews the destination address of the request and routes it to the network server 202 via cable 208c. The network server 202 responds with the requested data. The requested data is sent from the network server 202 to the network switch 204 via cable 208c. The network switch 204 routes the data to the desktop computer 206a via the passive full-duplex bidirectional ZPL network tap 300 and cables 208a, b.

To view the request made by the desktop computer 206a and response made by the network server 202, the passive full-duplex bidirectional ZPL network tap 300 is physically connected between the network switch 204 and desktop computer 206a. Full-duplex data flows simultaneously in both directions over the cables 208. Examples of bidirectional full-duplex signals are point to point Gigabit Ethernet data over the cable 208. In the present embodiment, the passive full-duplex bidirectional ZPL network tap 300 provides an independent copy, via the cables 212a, b, of the data flowing in either direction to the monitoring device 210. For example, a request from the desktop computer 206a travels through the network switch 204 to network server 202, and is tapped and sent out a tap port of the passive full-duplex bidirectional ZPL network tap 300 over cable 212a to the monitoring device 210. Likewise, data returning from the network server 202 is tapped and sent out another monitoring port of the passive full-duplex bidirectional ZPL network tap 300 over cable 212b to the monitoring device 210.

For purposes of discussion, selected components of the computer network 200 as included in the network segment 201 were discussed above. The computer network 200 can be thought of as having a plurality of such segments, such as network segments 213 and 223 shown in FIG. 2. In more detail, the network segment 213 includes a switch 214 and computers 216a-c. The switch 214 is operably connected to a respective one of the n passive full-duplex bidirectional ZPL network taps 300, which in turn is operably connected to the monitoring device 220. Similarly, the network segment 223 includes a switch 224 and computers 226a-c. The switch 224 is operably connected to a respective one of the n ZPL taps 300, which in turn is operably connected to the monitoring device 230. The operation of the passive full-duplex bidirectional ZPL network taps 300 of the ZPL tap array 250 that are associated with the network segments 213 and 223 are the same as that described for the passive full-duplex bidirectional ZPL network tap of the network segment 201. Furthermore, note that the network segments described above are defined only for purposes of discussion and are merely representative of one of a variety of possible network and component configurations with respect to the ZPL network tap array 250. Note also that, for purposes of clarity, not all operable connections between the various network components are shown or explicitly identified.

Figure 3:
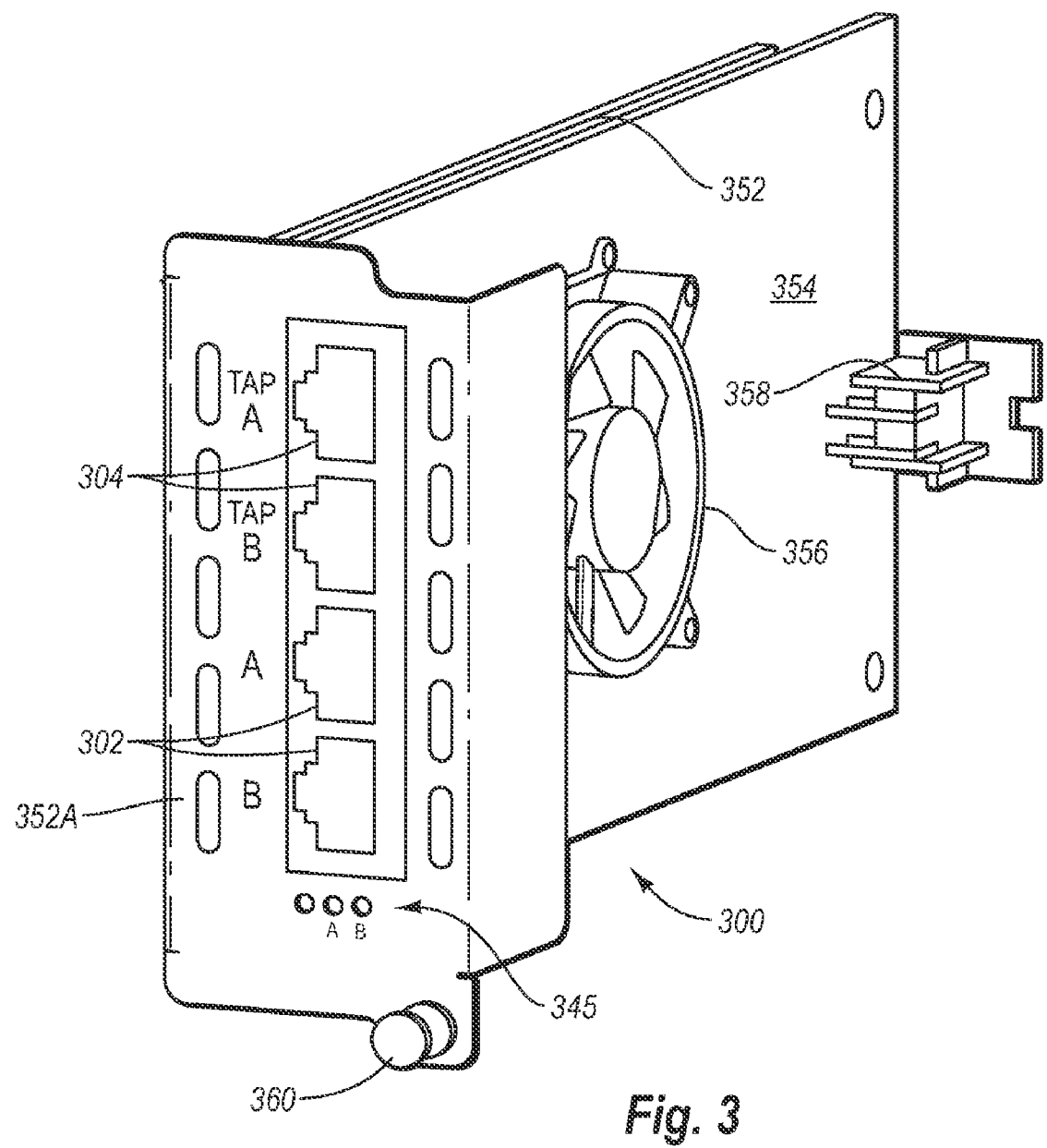
FIG. 3 illustrates a passive full-duplex bidirectional ZPL network tap.

Together with FIG. 2, reference is now made to FIG. 3, which depicts a network tap device in the form of one passive full-duplex bidirectional ZPL network tap 300, in accordance with one embodiment. The passive full-duplex bidirectional ZPL network tap 300 shown in FIG. 3 is also referred to herein as a 1×1 passive full-duplex bidirectional ZPL network tap and corresponds to any one of the passive full-duplex bidirectional ZPL network taps grouped together in the chassis 252 of the ZPL tap array 250 depicted in FIG. 2 and discussed above. As such, the collection of n passive full-duplex bidirectional ZPL network taps 300 in the ZPL tap array 250 can be employed to provide a non-aggregated Tapping function with respect to multiple data streams that are transmitted through the ZPL tap array 250 during operation.

In general, the passive full-duplex bidirectional ZPL network tap 300 is a plug-in type card that can be readily inserted into and removed from a chassis, such as the chassis 252 of FIG. 2. This card configuration is sometimes referred to as implementing a "blade" form factor. In one example implementation, the blade form factor for the 1×1 passive full-duplex bidirectional ZPL network TAP card is about 3.5 inches wide by about 1.4 inches high by about 5.5 inches deep. However, the scope of the invention is not limited to those exemplary dimensions.

Figure 4:
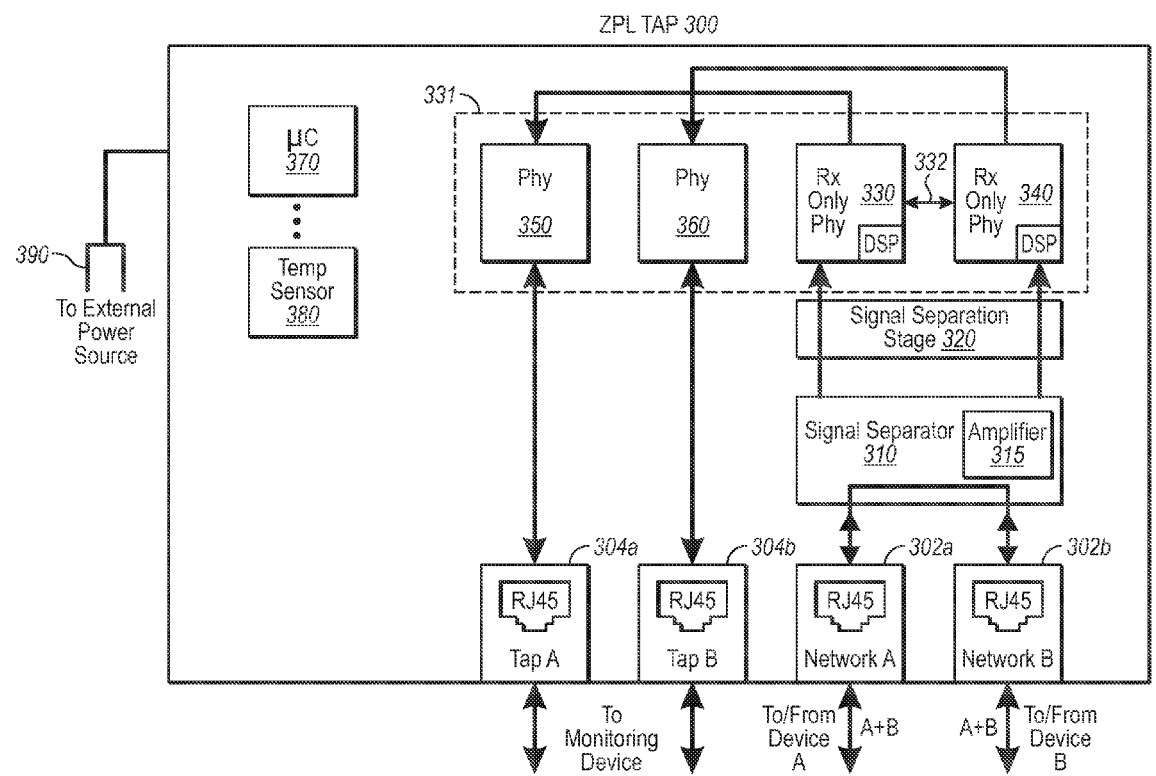
FIG. 4 illustrates internal and other features of the passive full-duplex bidirectional ZPL network tap.

In greater detail, the passive full-duplex bidirectional ZPL network tap 300 includes a housing 352 having a front face 352A. A plurality of ports 302 and 304, to be described further below, are included on the front face 352A for enabling connection of communication cables, such as the cables 208 and 212 shown in FIG. 2, with the passive full-duplex bidirectional ZPL network tap. A printed circuit board 354 is also included with the ZPL tap 300 on which a plurality of electronic components, some of which will be described below in connection with FIG. 4, are located. A fan 356 may be included on the printed circuit board so as to provide cooling as needed to the electronic board components. A power supply connector 358 is also included adjacent the rear portion of the passive full-duplex bidirectional ZPL network tap 300. In addition, a mounting component, such as a mounting screw 360, may be included on the front face 352A to assist in coupling the passive full-duplex bidirectional ZPL network tap 300 to the chassis 352. Note that the locations of ports 302 and 304 in FIG. 3 and the other figures is for illustration only as it is anticipated in some embodiments that the network ports 302 may be implemented above the tap ports 304.

II. Example Passive Full-Duplex Bidirectional ZPL Network Tap

Embodiments of an example passive full-duplex bidirectional ZPL network tap will now be discussed in further detail with respect to FIG. 4, which illustrates various internal and other features of the passive full-duplex bidirectional ZPL network tap 300 of FIG. 3 in greater detail. Note that it is anticipated that passive full-duplex bidirectional ZPL network tap 300 may also include additional features and components not discussed herein such as standard line isolation transformers.

For example, the passive full-duplex bidirectional ZPL network tap 300 includes various ports for receiving and transmitting data to and from network components, as depicted in FIG. 2. Two network ports 302a and 302b, also referred to herein as "network A" and "network B" ports, are configured to couple with cables 208a and 208b of the network 200 of FIG. 2, thereby interlinking the passive full-duplex bidirectional ZPL network tap 300 with the network. Similarly, two tap ports 304a and 304b, also referred to herein as "tap A" and "tap B" ports, are configured to couple with cables 212a and 212b (FIG. 2), thereby linking the passive full-duplex bidirectional ZPL network tap 300 to the monitoring device 210. Each of the ports 302 and 304 is configured to receive an RJ-45 plug of the respective cable 208 or 212, typical of Ethernet-based networks, though other port/plug configurations could be alternatively used. Thus, in the case of Cat5 cables 208a and 208b, four twisted pairs of each cable create eight total conductors that interconnect with terminals in the network ports A and B, thereby electrically connecting each cable with the passive full-duplex bidirectional ZPL network tap 300. As explained herein, the ports 302, 304 enable both data signals and/or ZPL signals to enter and depart the passive full-duplex bidirectional ZPL network tap 300, as will be described further below. As noted above, the data signals received by ports 302a and 302b are full duplex bidirectional signals, which will also be referred to herein as A+B data to denote the full duplex bidirectional nature of the signals coming from a device A and a device B coupled with passive full-duplex bidirectional ZPL network tap 300.

Passive full-duplex bidirectional ZPL network tap 300 also includes a signal separator 310 that is operably connected to both ports 302a and 302b. Signal separator 310 is configured to separate the A data from the B data received at ports 302a and 302b from each other and to provide the separated data streams to other components of the passive full-duplex bidirectional ZPL network tap 300. Signal separator 310 may be implemented in analog or digital hardware or any combination of the two. In some example embodiments, signal separator 310 may be implemented as a bidirectional coupler, dual directional coupler, or a differential bidirectional coupler, all of which will be described in more detail to follow. Note that all specific implementations of signal separator 310 disclosed herein are for illustration only and should not be used to limit the scope of the invention as signal separator 310 is not limited by to specific implementation. Note that the components discussed herein are "operably connected" to one another when data signals are able to pass from one component to the other. These connections are indicated in FIG. 4 by the arrows drawn between the various components.

In some embodiments, signal separator 310 may include an amplifier 315, which may be any reasonable amplifier. In other embodiments, the amplifier 315 may be coupled to the signal separator 310 and included in another portion of passive full-duplex bidirectional ZPL network tap 300. Amplifier 315 may be configured to amplify the signals that are separated by signal separator 310 prior to the separated signals being supplied to other portions of the ZPL tap 300.

As it may not be possible for signal separator 310 to fully separate the A and B full duplex data signals from each other, passive full-duplex bidirectional ZPL network tap 300 further includes a signal separation stage 320 that is operably connected to signal separator 310 and/or one of the Phys 330-360 described below. Signal separation stage 320 receives at least partially separated signals from the signal separator 310 and is configured to further separate the A and B data from each other. Signal separation stage 320 may be implemented as a separate process or operation, or as discrete circuit components included in the signal separator 310. Signal separation stage 320 may also be implemented as a part of one of the Phys 330-360. The signal separation stage or module 320 may also be included in a microprocessor 370. In some embodiments, signal separation stage 320 may be dispersed among several of the components of the passive full-duplex bidirectional ZPL network tap 300. Signal separation stage 320 will be discussed in more detail to follow.

Passive full-duplex bidirectional ZPL network tap 300 also includes Physical Interface Device ("Phy") Phys 330-360. These Phys may be individual Phys, be contained in two dual packages or one quad package as shown by dashed line 331. As illustrated, Phy 330 and Phy 340 are operably connected to signal separator 310 and/or signal separation stage 320. Phys 330 and 340 are further operably connected to Phy 350 and Phy 360 respectively. Phy 350 and Phy 360 are in turn operably connected to tap ports 304a and 304b respectively. Note that one or more line isolation transformers (not illustrated) may be coupled between Phys 350 and 360 and tap ports 304a and 304b for performing signal isolation functions for the respective data signal passing through the line isolation transformers during tap operation.

The Phys 330-360 represent integrated circuitry or functional blocks that provide physical access to the data stream received from ports 302 and 304. The Phys 330-360 are further configured to receive a data signal and convert it to a particular data format. For instance, in one embodiment Phys 330 and 340 receive data signals from the signal separator 310 in a 1000BASE-T signal format, used with Cat5 copper cabling, and convert the signals to a digital data signal stream in preparation for later use. Note that Phys 330 and 340 are configured according to the principles of the present invention to be listen only or receive only Phys. This novel functionality will be explained in more detail to follow.

In some embodiments, a microcontroller 370 that is programmed to monitor and control the operation of the passive full-duplex bidirectional ZPL network tap 300 is also included. In general, the microcontroller 370 includes various components, including integrated A/D ("Analog to Digital") converter inputs as well as digitally programmable inputs and outputs ("I/O"), and is programmed as desired to enable achievement of desired functions with respect to the operation of the ZPL network tap. By way of example, the microcontroller 370 is programmed to configure Phys 330-360 to perform the data format translation needed for proper operation of the passive full-duplex bidirectional ZPL network tap 300. Generally, the microcontroller 370 can include internal diagnostic circuitry that enables the passive full-duplex bidirectional ZPL network tap 300 to identify and report faults in the operation of the tap and/or with regard to operation of the computer network 200 with which the ZPL tap 300 is connected. In some embodiments, the diagnostic circuitry of the microcontroller 370 also provides the capability for the passive full-duplex bidirectional ZPL network tap 300 to resolve identified faults. Some embodiments of the invention include indicators, such as LED visual indicators 345 (FIG. 3), which operate in connection with the diagnostic circuitry to provide a user with information concerning the operational status and condition of the ZPL tap 300.

Similarly, FIG. 4 shows that the passive fall-duplex bidirectional ZPL network tap 300 includes a temperature sensor 380, operably connected to the microcontroller 370, for monitoring one or more temperature conditions relating to operation of the tap. Should excessive temperature conditions be encountered, the microcontroller 370 can direct corrective measures to be taken so as to prevent damage to the passive fall-duplex bidirectional ZPL network tap 300 or interruption of the data stream. The microcontroller 370 can also control operation of any user interface, such as an LED panel.

FIG. 4 further shows the passive full-duplex bidirectional ZPL network tap 300 as including a traditional external power link 390 for plugging into a wall outlet, for instance. As mentioned previously, passive full-duplex bidirectional ZPL network tap 300 may also include various other components that are not illustrated.

III. Example Signal Separators Including Differential Bidirectional Couplers

Figure 5A:
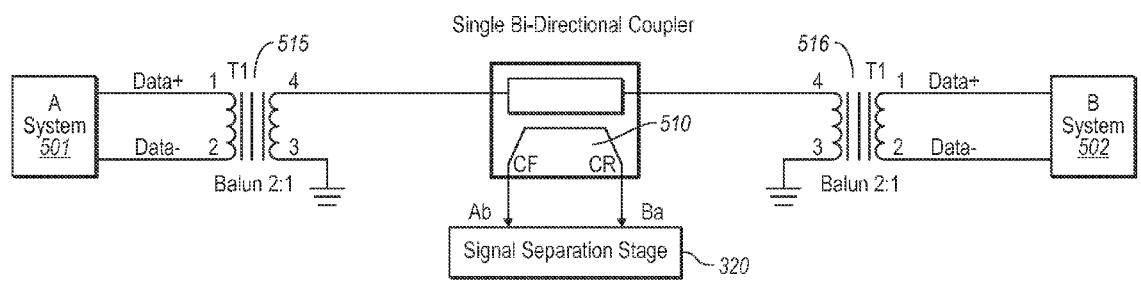
FIGS. 5A-5C illustrate embodiments of signal separators with bidirectional couplers.
Figure 5B:
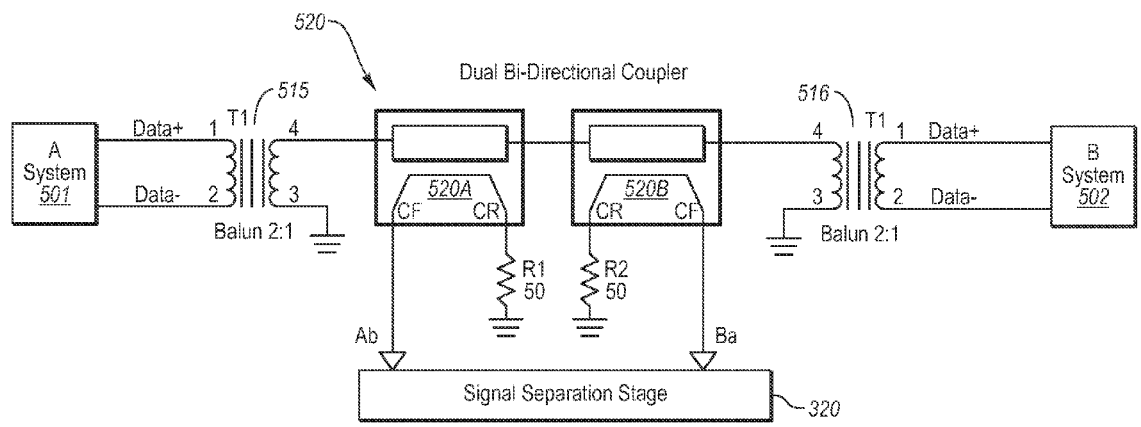
Figure 5C:
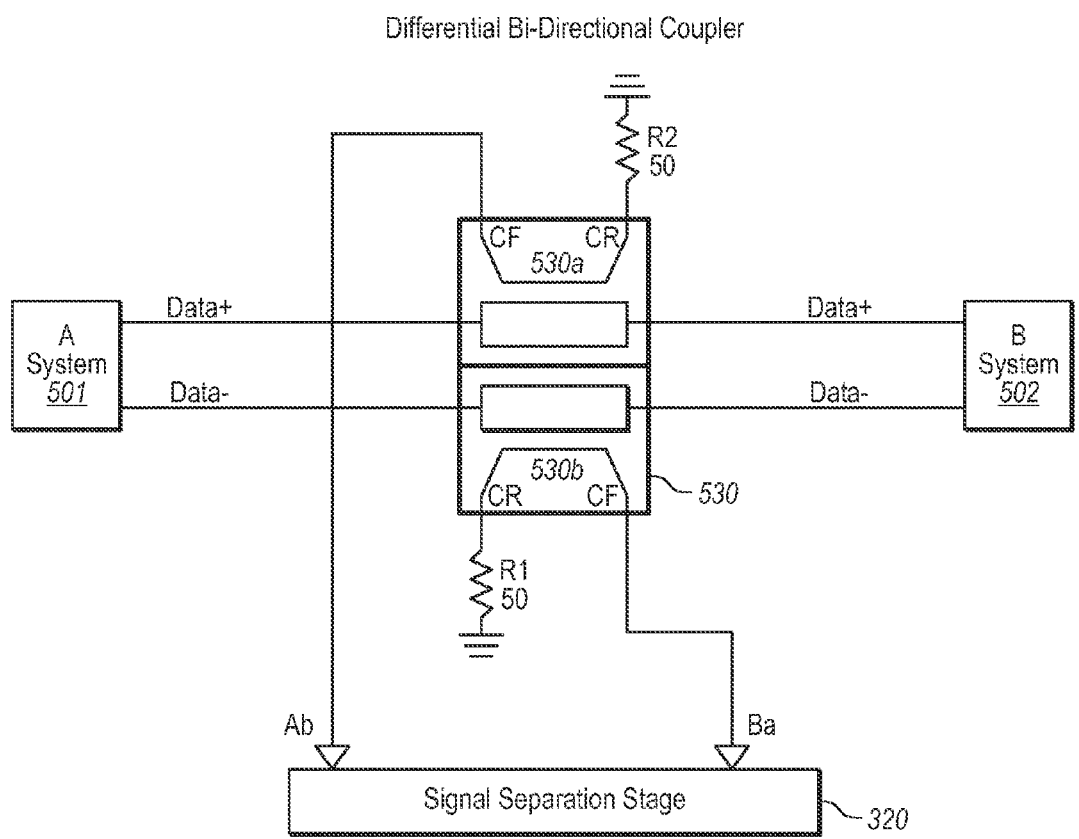

As mentioned previously, signal separator 310 may be implemented in various forms. Referring to FIGS. 5A-5C, three different example embodiments of signal separator 310 are depicted as various bidirectional couplers. Note that the example bidirectional couplers of FIGS. 5A-5C are for illustration only and are not meant to limit the scope of the appended claims. As will be appreciated, any reasonable bidirectional coupler may be used to implement the principles of the present invention. The example bidirectional couplers of FIG. 5 may have the following characteristics: 20 dB of coupling, 1 to 2 dB of insertion loss, and 20 dB of directivity. Note that these characteristics are only examples of the many characteristics of a bidirectional coupler that may be implemented according to the principles of the present invention and should not be used to limit the scope of the appended claims. Also note that although FIGS. 5A-5C depict a bidirectional coupler for a single twisted pair cable, it is also contemplated that the various bidirectional couplers of FIGS. 5A-5C may include additional couplers for additional twisted pairs. For example, a coupler for a Cat5 cable would have four couplers for the four twisted pairs of the Cat5 cable.

Referring to FIG. 5A, an example single bidirectional coupler 510 is depicted as being coupled to the communication path with an Ethernet device 501 (A system) and an Ethernet device 502 (B system). As mentioned previously, the Ethernet devices communicate using a full duplex bidirectional 100 ohm differential twisted pair cable, which is depicted in FIGS. 5A-5C as the DATA+ and DATA− lines. However, single bidirectional coupler 510 is configured for a single ended 50 ohm line. Accordingly, impendence matching circuits 515 and 516 are implemented to match the 100 ohm twisted pair to the 50 ohm single ended line so that the A and B data can flow through the coupler 510 to the Ethernet devices 501 and 502 respectively. As impendence matching circuits of this type are well known in the art, no further description is necessary.

In operation, single bidirectional coupler 510 is configured to couple a sample of the A data out of the full duplex bidirectional A+B data being transmitted and to also couple a sample of the B data out of the A+B being transmitted. Since coupler 510 is a bidirectional coupler, coupler 510 includes a couple forward (CF) and a couple reverse (CR) node that are both used in the coupling operation. For example, the CF node is used to couple out the A data and the CR node is used to couple out the B data. However, since the A+B data is bidirectional, coupler 510 may not be able to fully isolate the A and B data and consequently may couple out a sampled signal that is labeled as Ab data, which illustrates that the signal mostly comprises A data, but may have some portion of B data included. Coupler 510 may further couple out a sampled signal that is labeled as Ba data, which illustrates that the signal mostly comprises B data, but may have some portion of A data included. The sampled signals may then be provided to signal separation stage 320 for further signal isolation, although this is not required. Note that single bidirectional coupler 510 allows for continuous communication between the Ethernet 501 and 502 devices. Of course in this example and in the examples to follow, it also possible to reverse the polarity of the signals into the couplers such that the CF node couples out the Ba data and the CR node couples out the Ab data.

Referring to FIG. 5B, an example dual bidirectional coupler 520 is depicted as being coupled to a communication path with an Ethernet device 501 (A system) and an Ethernet device 502 (B system). Dual bidirectional coupler 520 may achieve better signal separation than single bidirectional coupler 510 of FIG. 3A. Dual bidirectional coupler 520 includes a first bidirectional coupler stage 520A coupled to a second bidirectional coupler stage 520B. Note that the use of first, second, and so on in the claims and in the specification is not meant to imply any type of ordering, but is only meant to distinguish one component from another. As mentioned previously with respect to FIG. 5A, the Ethernet devices 501 and 502 communicate using a 100 ohm differential twisted pair cable, while dual bidirectional coupler 520 is configured for a single ended 50 ohm line. Accordingly, impendence matching circuits 515 and 516, which have the same functionality as the matching circuits of FIG. 5A, are implemented to allow for signal transmission.

In operation, bidirectional coupler stage 520A is configured to couple a sample of the A data out of the full-duplex bidirectional A+B data being transmitted. Since coupler stage 520A is a bidirectional coupler stage, coupler stage 520A includes a CF and a CR node. The CR node, however, is typically terminated in a 50 ohm termination as coupler stage 520A is configured to sample the forward A data and not the reverse B data. However, since the A+B data is bidirectional, coupler stage 520A may not be able to fully isolate the B data and consequently may couple out a sampled signal that is labeled as Ab data, which illustrates that the signal mostly comprises A data, but may have some portion of B data included. Note that bidirectional coupler stage 520A allows for continuous communication between the Ethernet 501 and 502 devices.

In like manner, bidirectional coupler stage 520B is configured to couple a sample of the B data out of the full duplex bidirectional A+B data being transmitted. Since coupler stage 520B is a bidirectional coupler stage, coupler stage 520B also includes a CF and a CR node. The CR node is also typically terminated in a 50 ohm termination as coupler stage 520B is configured to sample the forward B data and not the reverse A data. However, since the A+B data is bidirectional, coupler stage 520B may not be able to fully isolate the A data and consequently may couple out a sampled signal that is labeled as Ba data, which illustrates that the signal mostly comprises B data, but may have some portion of A data included. Note that single bidirectional coupler stage 520B also allows for continuous communication between the Ethernet 501 and 502 devices. The sampled Ab and Ba data may then be provided to signal separation stage 320 for further separation if necessary.

Referring now to FIG. 5C, a differential bidirectional coupler 530 is depicted as being coupled to the communication path with an Ethernet device 501 (A system) and an Ethernet device 502 (B system). Differential bidirectional coupler 530 may achieve better signal separation than either of the couplers discussed in relation to FIGS. 5A and 5B. Differential bidirectional coupler 530 includes a first coupler stage 530A and a second coupler stage 530B. Note that the configuration of coupler 530 allows for the direct coupling of the 100 ohm differential lines without the need for impedance matching circuits such as circuits 515 and 516. As with the other coupler examples, differential bidirectional coupler 530 also allows for continuous communication between the Ethernet 501 and 502 devices.

In operation, coupler stage 530A is configured to couple a sample of the A data out of the full-duplex bidirectional A+B data being transmitted. Being bidirectional, coupler stage 530A includes a CR node that is terminated in a 50 Ohm termination, while the CF node couples out the forward Ab signal as described previously. In like manner, coupler stage 530B couples a sample of the B data out of the A+B data being transmitted. Coupler stage 530B, also being bidirectional, includes a CR node that is terminated in a 50 Ohm termination, while the CF node couples out the forward Ba signal as described previously. The Ab and Ba signals may then be provided to signal separation stage 320 if necessary.

IV. Example Signal Separation Stage

As mentioned previously, signal separation stage 320 may be implemented in one or more components of the passive full-duplex bidirectional ZPL network tap 300 or it may be a stand alone component of the ZPL tap 300. Signal separation stage 320 may include both hardware, whether discrete analog or digital components, and software, or any combination of hardware and software, that may be used to implement various methods that are configured to further separate the A component from the Ab signal and the B component from the Ba signal.

In one embodiment, signal separation stage 320 may be implemented as a programmable attenuator and a differencing amplifier with gain that may be part of signal separator 310 or stand alone components. In other embodiments, signal separation stage 320 may be implemented as a Digital Signal Processing (DSP) module that is included in both Phys 330 and 340. In still other embodiments, the signal separation stage may be included as a module of processor 370. In further embodiments, the signal separation module may be distributed across the signal separator 310, the Phys 330 and/or 340, and the processor 370 or even other components of the passive full-duplex bidirectional ZPL network tap 300.

Figure 9:
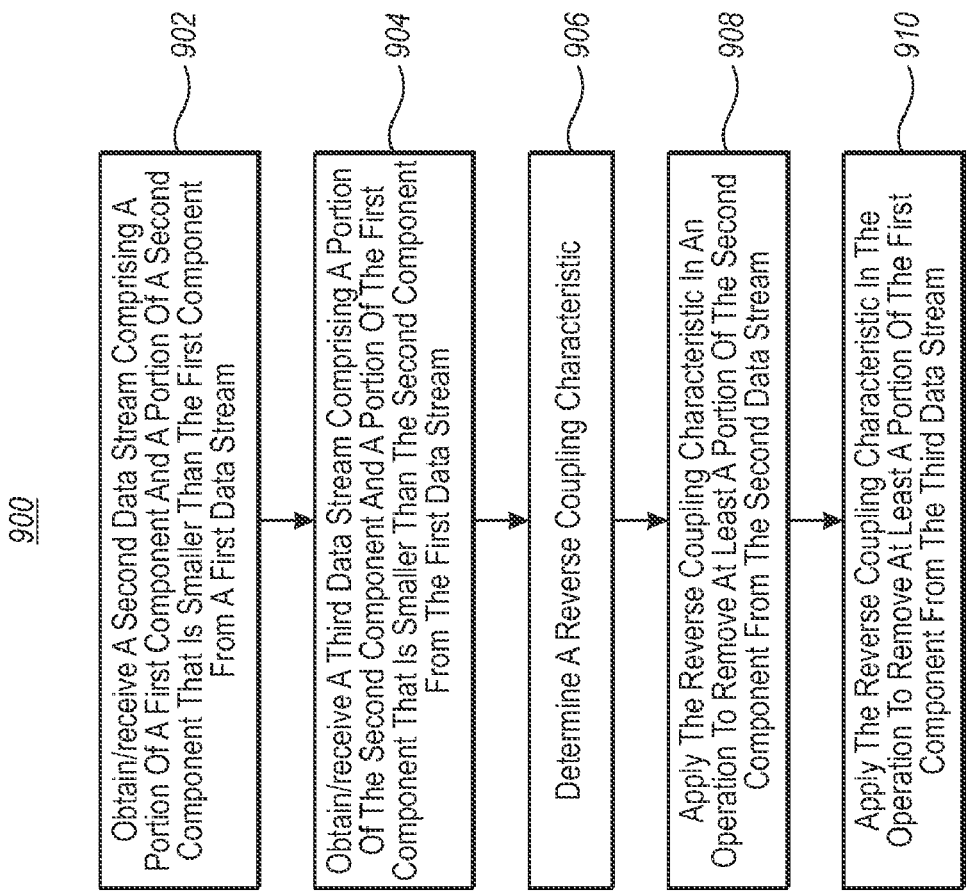
FIG. 9 illustrates a method for separating a first and a second signal component from a first data stream used in full-duplex bidirectional communication between two devices according to principles of the present invention.

Referring now to FIG. 9, FIG. 9 illustrates a method 900 for a signal separation stage implemented in a signal separator 310, a DSP module implemented in each one of Phys 330 and 340, or processor 370, either separately or in combination, to separate a first and a second signal component from a first data stream used in communication between two devices. Note that although the method 900 will be described in relation to the environment of FIGS. 4 and 5, this is for illustration only and should not be used to limit the scope of the appended claims. It is anticipated that method 900 may be practiced in numerous environments.

Method 900 includes obtaining or receiving 902 from the first data stream a second data stream comprising at least a portion of the first component and a portion of the second component that is smaller than the first component. For example, in one embodiment, signal separator 310 may obtain a second data stream that includes the A data and a portion of B data that is smaller than the A data (e.g., signal Ab) as previously explained. In alternative embodiments, the second data stream including the A data and the portion of B data may be received by a receive module of processor 370 or of a DSP module of Phys 330 and 340.

Method 900 also includes obtaining or receiving 904 from the first data stream a third data stream comprising at least a portion of the second component and a portion of the first component that is smaller than the second component. For example, in one embodiment, signal separator 310 may obtain a third data stream that includes the B data and a portion of A data that is smaller than the B data (e.g., signal Ba) as previously explained. In alternative embodiments, the third data stream including the B data and the portion of A data may be received by a receive module of processor 370 or of a DSP module of Phys 330 and 340.

Method 900 further includes determining 906 a reverse coupling characteristic. For example, a characterization module of the signal separator 310, processor 370 or a DSP module of the Phys 330 and 340 may determine, based on the coupling characteristics of signal separator 310, the reverse coupling characteristic. In other embodiments, a reverse coupling characteristic that has been determined ahead of time may be obtained by the characterization module. Note that for the purposes of the embodiments disclosed herein, obtaining a predetermined reverse coupling characteristic is considered to be a form of determining the reverse coupling characteristic.

Method 900 additionally includes applying 908 the reverse coupling characteristic in an operation to remove at least a portion of the second component from the second data stream. For example, the signal separator 310, processor 370 or a DSP module of the Phys 330 and 340 may perform the operation, as will be explained in more detail to follow, to remove at least some of the B data from the second data stream, thus leaving substantially only the A data as part of the second data stream.

Method 900 finally includes applying 910 the reverse coupling characteristic in an operation to remove at least a portion of the first component from the third data stream. For example, the signal separator 310, processor 370 or a DSP module of the Phys 330 and 340 may perform the operation, as will be explained in more detail to follow, to remove at least some of the A data from the third data stream, thus leaving substantially only the B data as part of the third data stream.

Figure 10:
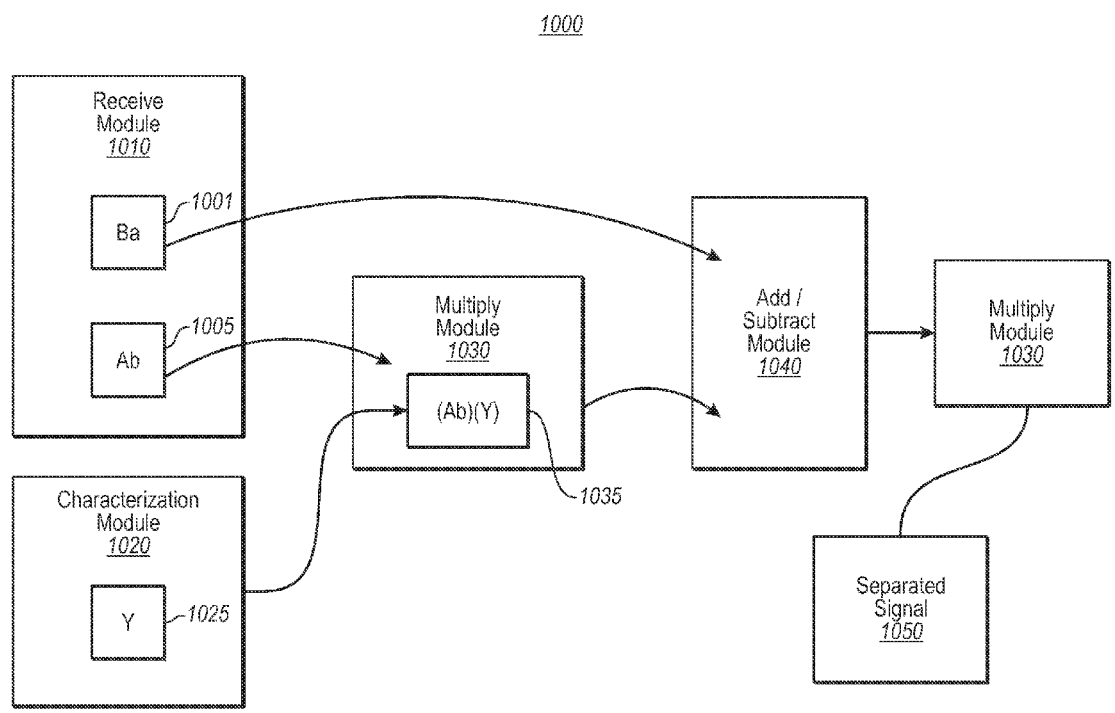
FIG. 10 illustrates an environment and process flow that may be implemented to perform an operation to extract the a first signal component from a data stream comprising the first component and a second component that is less than the first component according to principles of the present invention.

FIG. 10 illustrates an environment and process flow 1000 that may be implemented to perform an operation to extract the B data from a data stream comprising B data and a portion of A data that is less than the B data or the A data from a data stream comprising A data and a portion of B data that is less than the A data. Note that the modules and components of environment 1000 may be included as part of signal separator 310, processor 370, a DSP module of Phys 330 and 340, or some other component of passive full-duplex bidirectional ZPL network tap 300. Alternatively, the modules and components of environment 1000 may be disturbed across one or more of the signal separator 310, processor 370, a DSP module of Phys 330 and 340, or some other component of passive full-duplex bidirectional ZPL network tap 300. Note that the modules and components of environment 1000 may be implemented as hardware, software, or any combination of the two without restriction as circumstances may warrant.

For example, a receive module 1010 may receive a data stream 1001 that comprises B data and a portion of A data that is smaller than the B data. This is denoted as Ba data. In addition, the receive module 1010 may also receive a data stream 1005 that comprises A data and a portion of B data that is smaller that the A data and is denoted as Ab data. Note that the data streams 1001 and 1005 may be received from the signal separating portions of signal separator 310.

The environment 1000 may include a characterization module 1020. Characterization module is configured to determine or alternatively to receive from another source, the reverse coupling characteristic 1025 for the signal separator 310. The reverse coupling characteristic is denoted as a factor γ.

The data stream 1005 and the reverse coupling characteristic 1030 may then be received by a multiply module 1030. The multiply module is configured to multiply data stream 1030 and reverse coupling characteristic to produce a signal 1035.

An add/subtract module 1040 then subtracts the signal 1035 from the data stream 1001. The difference is then provided to multiply module 1030, where the difference is multiplied by $1/(1-\gamma^2)$. The resultant separated signal 1050 will be comprised substantially of B data and no A data. The A data can be extracted by using this same method.

In mathematical terms, the process flow of environment 1000 is illustrated below. Note that equations 1 and 2 are derived directly from the process flow of environment 1000. Equations 3 and 4 are based on the fact that the a data and b data are equal to the reverse coupling characteristic times the A data and B data respectively.

$$A = (Ab - \gamma Ba)/(1-\gamma^2) \quad \text{(Equation 1)}$$

$$B = (Ba - \gamma Ab)/(1-\gamma^2) \quad \text{(Equation 2)}$$

For example, to extract B $$a = \gamma A \quad \text{(Equation 3)}$$

$$b = \gamma B \quad \text{(Equation 4)}$$

$$Ba = B + a = B + \gamma A \quad \text{(Equation 5)}$$

$$Ab = A + b = A + \gamma B \quad \text{(Equation 6)}$$

Substituting:

$$B = (B + \gamma A - \gamma(A + \gamma B))/(1-\gamma^2)$$

$$B = (B + \gamma A - \gamma A - \gamma^2 B)/(1-\gamma^2)$$

$$B = (B - \gamma^2 B)/(1-\gamma^2)$$

$$B = B(1-\gamma^2)/(1-\gamma^2)$$

$$B = B$$

Note that method and process flow shown in relation to environment 1000 is only one of many possible signal separation operations and should not be used to limit the scope of the invention.

In some embodiments, signal separation stage 320 can achieve at least 80% separation of the signals. For example, if the signal separation stage 320 were separating out the Ab signal, then 80% of the resulting signal would be A data and 20% would be b data. In other embodiments, signal separation stage 320 may achieve 90% separation of signals. The 80% and 90% examples are meant to be typical examples with other percentages contemplated so as to enable the Phys to receive the separated signals in as pure a form as possible.

Referring now to FIGS. 6A-6D, examples of actual signal separation achievable by signal separator 310 by itself or in combination with signal separation stage 320 is illustrated. These figures illustrate actual results as measured on various test equipment.

Figure 6A:
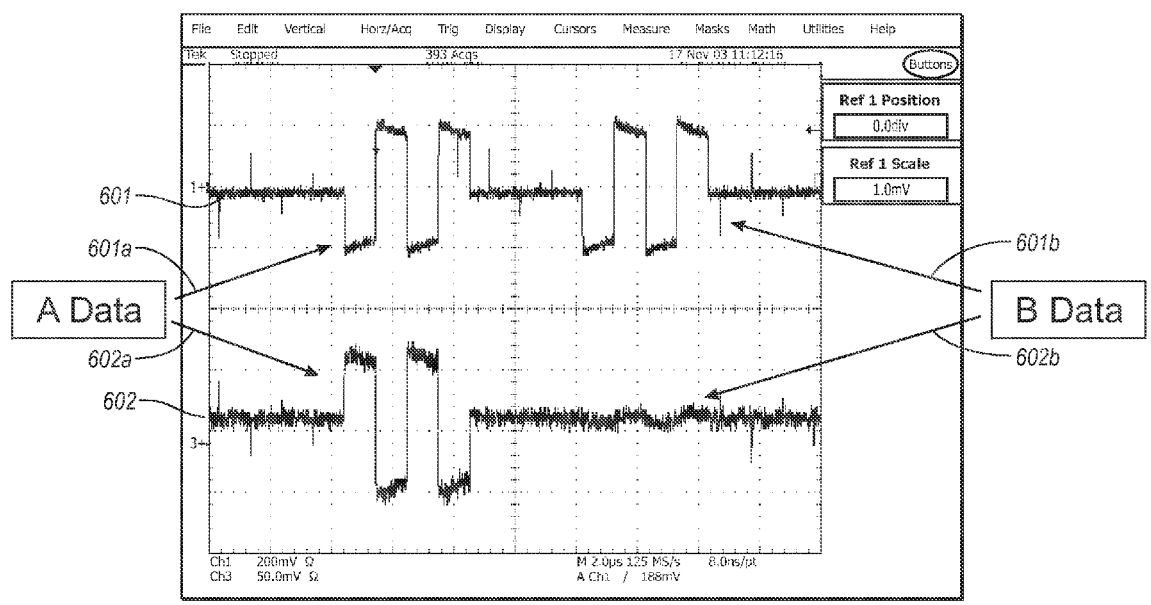
FIGS. 6A-6D illustrate examples of actual signal separation achievable by a signal separator by itself or in combination with a signal separation stage.

FIG. 6A includes a signal 601 which illustrates the A+B data of FIG. 4. Signal 601 includes an A data portion 601a and a B data portion 601b. FIG. 6A further illustrates the results of subjecting signal 601 to passive full-duplex bidirectional ZPL network tap 300, specifically signal separator 310 by itself or in combination with signal separation stage 320. The resultant signal is designated as 602. As illustrated, signal 602 includes an A data portion 602a that is substantially similar to an inverted A data portion 601a. The B data portion 602b, however, has substantially been removed from signal 602. Accordingly, passive full-duplex bidirectional ZPL network 300 is shown to achieve a high level of success in separating the B data from the A data.

Figure 6B:
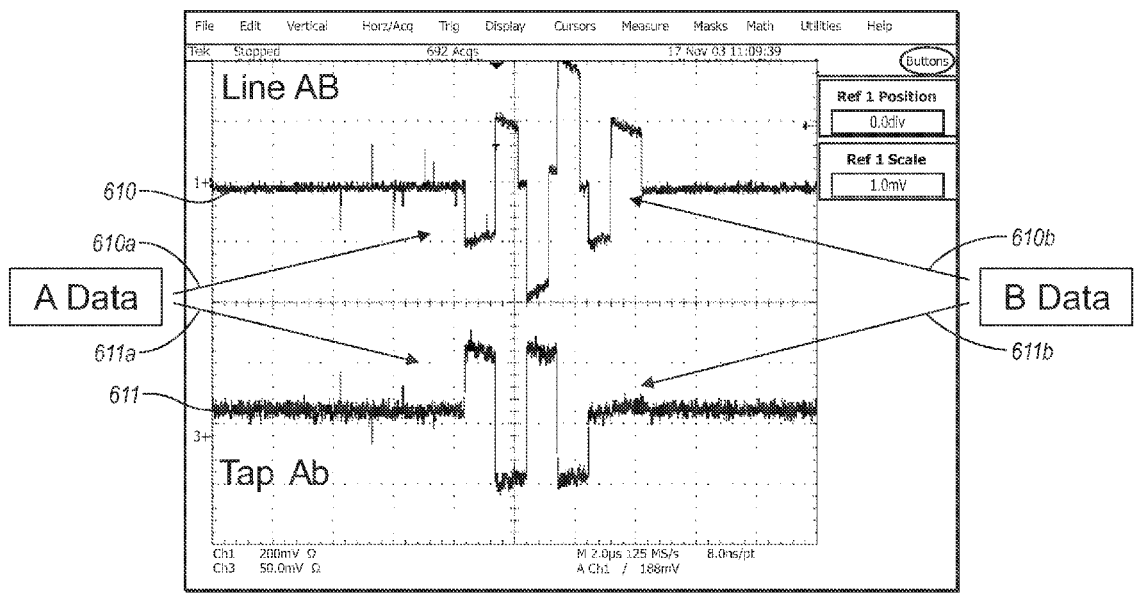

In like manner, FIG. 6B also includes a signal 610 that illustrates the A+B data of FIG. 4. Signal 610 includes an A data portion 610a and a B data portion 610b. FIG. 6B further illustrates the results of subjecting signal 610 to the passive full-duplex bidirectional ZPL network tap 300, specifically signal separator 310 by itself or in combination with signal separation stage 320. The resultant signal is designated as 611. As illustrated, signal 611 includes an A data portion 611a that is substantially similar to an inverted A data portion 610a. The B data portion 611b, however, has substantially been removed from signal 611. Accordingly, passive fall-duplex bidirectional ZPL network 300 is once again shown to achieve a high level of success in separating the B data from the A data.

Figure 6C:
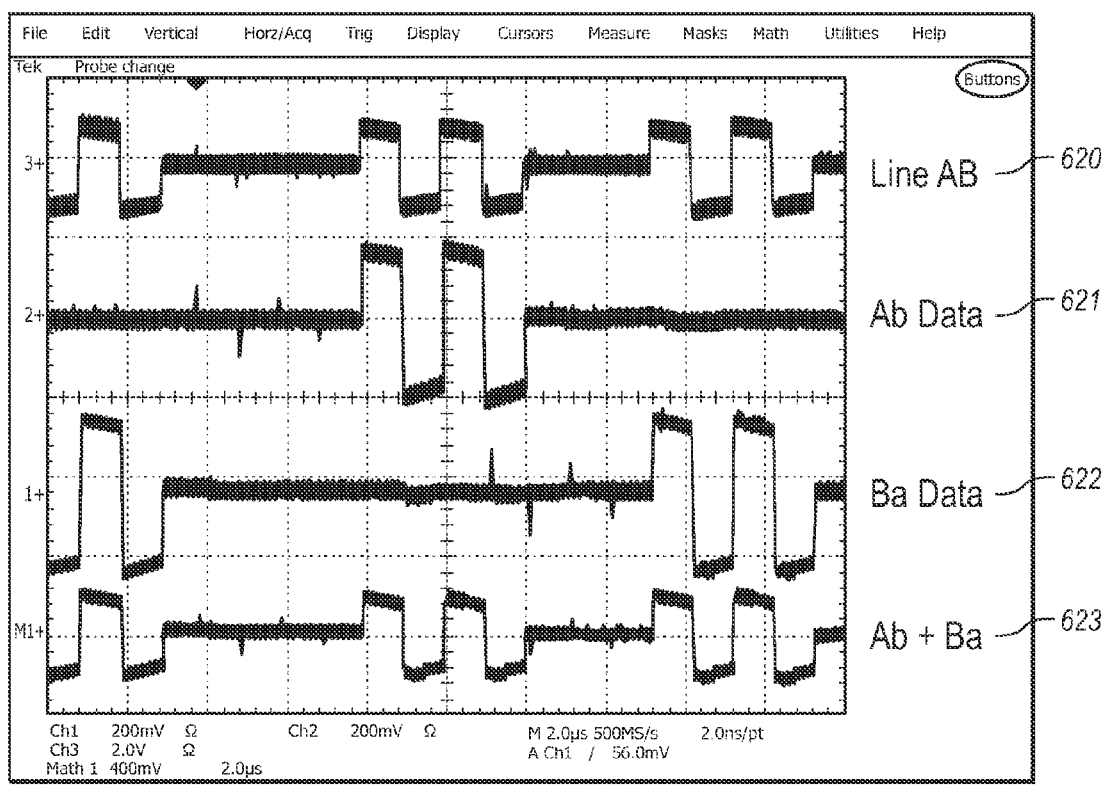

FIG. 6C illustrates in further detail the signal separation that may be achieved by passive full-duplex bidirectional ZPL network tap 300. For example, FIG. 6C illustrates a signal 620 which may correspond to the full-duplex bidirectional A+B data of FIG. 4. As such, signal 620 includes both an A data and B data portions. FIG. 6C further illustrates the results of subjecting signal 620 to passive full-duplex bidirectional ZPL network tap 300, specifically signal separator 310 by itself or in combination with signal separation stage 320. These results are designated as signals 621 and 622.

For example, signal 621 illustrates an A data portion that is substantially similar to the A data portion of signal 620 while having a B data portion that has been substantially removed. In like manner, signal 622 includes a B portion that is substantially similar to the B data portion of signal 620 while having an A data portion that has been substantially removed. Finally, FIG. 6C includes a signal 623 that is the combination of signals 621 and 622. Signal 623 illustrates that combining the two signals that have been subjected to signal separation (e.g., signals 621 and 622) produces a signal that is substantially similar to signal 620.

Figure 6D:
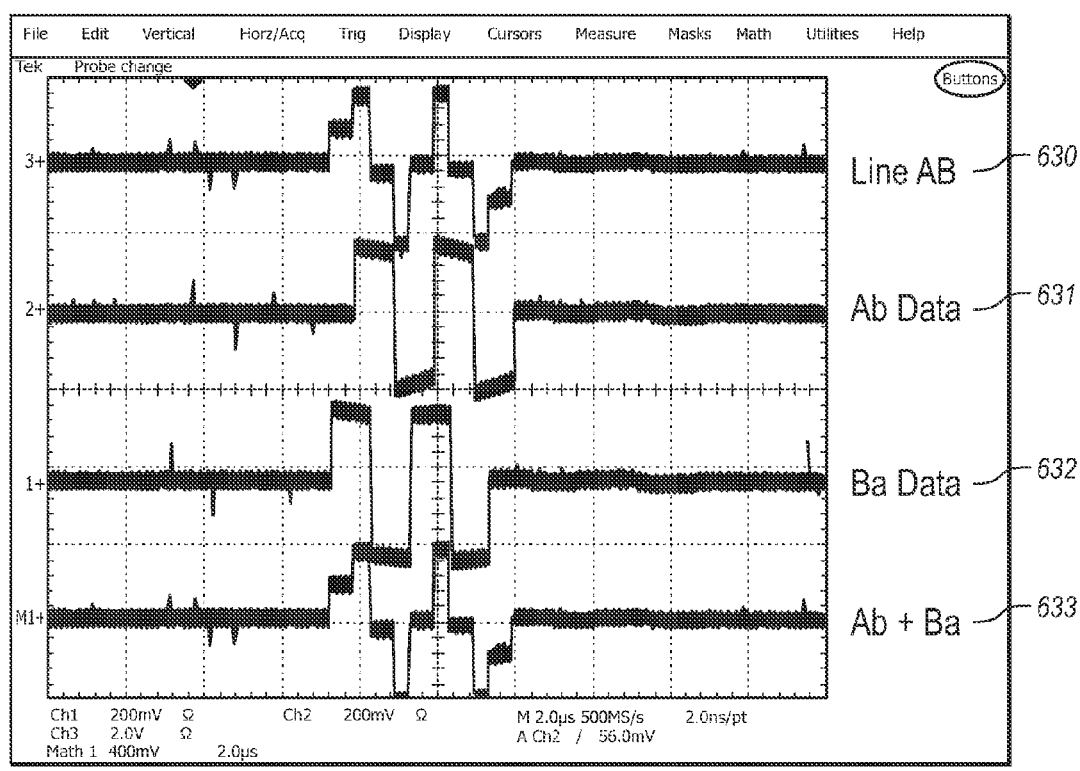

In similar manner, FIG. 6D illustrates in further detail the signal separation that may be achieved by passive full-duplex bidirectional ZPL network tap 300. For example, FIG. 6D also illustrates a signal 630 which may correspond to the full-duplex bidirectional A+B data of FIG. 4. As such, signal 630 includes both an A data and B data portions. FIG. 6D further illustrates the results of subjecting signal 630 to passive full-duplex bidirectional ZPL network tap 300, specifically signal separator 310 by itself or in combination with signal separation stage 320. These results are designated as signals 631 and 632.

For example, signal 631 illustrates an A data portion that is substantially similar to the A data portion of signal 630 while having a B data portion that has been substantially removed. In like manner, signal 632 includes a B portion that is substantially similar to the B data portion of signal 630 while having an A data portion that has been substantially removed. Finally, FIG. 6D also includes a signal 633 that is the combination of signals 631 and 632 and that produces a signal that is substantially similar to signal 630.

V. Example Phys

As previously mentioned, passive full-duplex bidirectional ZPL network tap 300 also includes Phys 330-360. In one embodiment, the Phy IC chips may be configured in a quad configuration included on a single chip as illustrated at 331 in FIG. 4. The quad Phy 331 may consist of the four Phys 330-360. In other embodiments, the Phys 330-360 may be individual, separate IC chips. In still other embodiments, the Phy IC chips may be implemented as any combination of two of the Phys, for example Phys 330 and 350 on an IC chip and Phys 340 and 360 on an IC chip. In some embodiments, Phy 330 and 340 may have a connection 332 that allows the chips to communicate with each other when implemented as separate chips. Note that the exact implementation of the Phy chips 330-360 (e.g., as a quad chip, separate, individual chips, or any combination of two of the Phys) is not important to the principles of the present invention. Further note that the actual implementation of the internal circuitry and internal operations of the Phy ICs is unimportant to the principles of the present invention. Rather, it is the terminal characteristics of the Phy ICs, especially a unidirectional or listen only terminal characteristic, that are important to the principles of the present invention, as will be explained in more detail to follow.

The Phys, whether implemented as a quad Phy IC 331 chip or individual Phy IC chips 330-360, are configured to have specific terminal characteristics. For example, Phy IC chips 330 and 340 are configured to be receive or listen only Phys. This means that Phys 330 and 340, regardless of how implemented (e.g., as part of a quad chip, separate, individual chips, or any combination of two of the Phys), have front ends that are different from the prior art Phys previously described in that Phys 330 and 340 have front ends that do not transmit. For example, Phys 330 and 340 ignore any auto negotiations between Ethernet or other protocol implanting devices A and B that are coupled to passive full-duplex bidirectional ZPL network tap 300 and therefore do not need to undergo any training by the devices before the Phy IC chips can lock onto and monitor the signals between devices A and B. Instead, the Phys 330 and 340 monitor the full-duplex bidirectional communication between devices A and B until a data unit such as a header or idle is recognized, at which time the Phys 330 and 340 lock onto the monitored signal. Both Phy IC chips operate as slave only chips that use the received signal clock and have no echo canceling.

Phys 330 and 340 can be power cycled on and off without network communication being effected and both can monitor the conversation between devices A and B at any time. In other words, the listen only Phys 330 and 340 may lock onto the communication signals between devices A and B without any external help from the network devices. Accordingly, Phys 330 and 340 are configured as unidirectional receive only Phy ICs. In some embodiments, as mentioned previously, one or more of the Phy ICs may include digital signal processing that may assist in further signal separation or, as mentioned previously, may act as the signal separation stage 320.

Operation of the unidirectional receive only Phys 330 and 340 will now be described. As illustrated in FIG. 4, Phy 330 receives the recovered A data and what portion of B data remains from the signal separation stage 320 and/or the signal separator 310. Phy 330 then provides the signal to Phy 350, which in turn provides the signal to a monitoring device A through tap port 304a. In like manner, Phy 340 receives the recovered B data and what portion of A data remains from the signal separation stage 320 and/or the signal separator 310. Phy 340 then provides the signal to Phy 360, which in turn provides the signal to a monitoring device B through tap port 304b.

Figure 11:
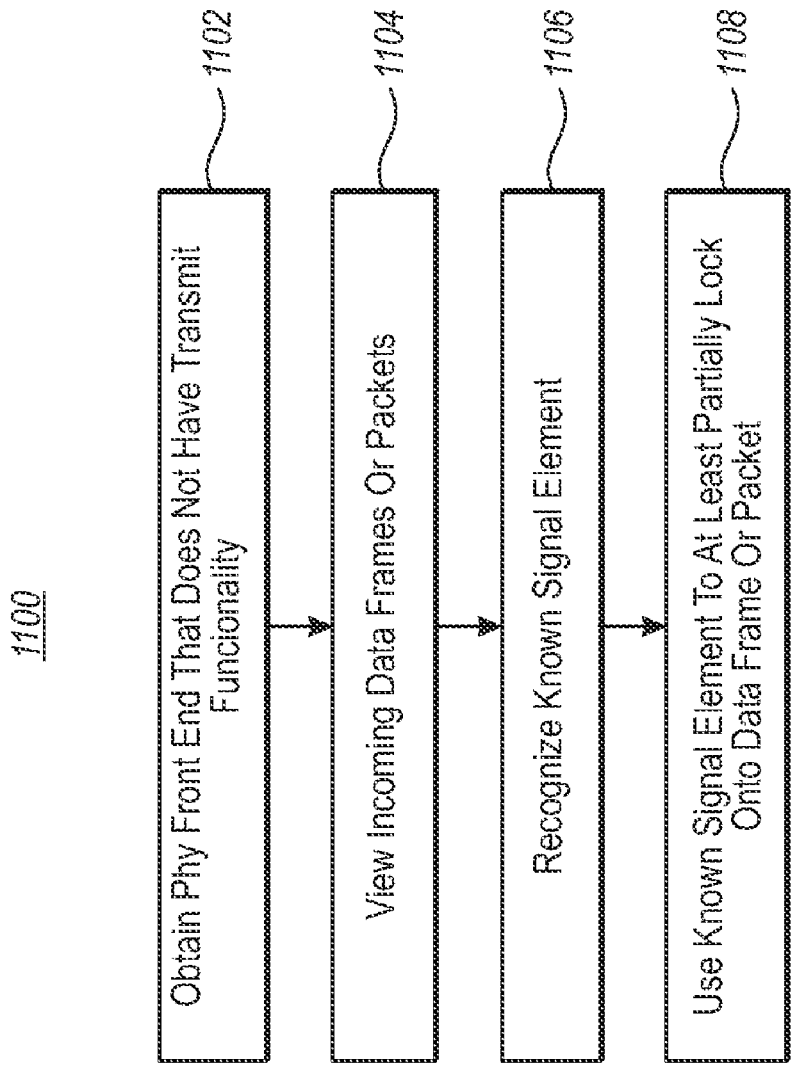
FIG. 11 illustrates a method for configuring and using a listen or receive only Phy according to principles of the present invention.

As mentioned above, the Phys 330 and 340 are configured in a novel way different from conventional Phys to have front end terminal characteristics that make them listen only or receive only Phys. FIG. 11 illustrates a method 1100 for configuring and using a listen only or receive only Phy according to the principles of the present invention. Such a method was successfully performed using the DP83865 10/100/1000 Ethernet Physical Layer chip available from National Semiconductor Corporation doing business at 2900 Semiconductor Drive, Santa Clara, Calif. 95052-8090. Note however, that method 1100 is not limited to the use of the DP83865 chip.

Method 1100 includes obtaining 1102 a Phy 330 or 340 with a front end that does not have transmit functionality. For example, in some embodiments, a Phy 330 or 340 implemented using the DP83865 10/100/1000 Ethernet Physical Layer chip available from National Semiconductor Corporation may have its front end transmit functionality disabled by obtaining a firmware patch configured to disable the transmit functionality. For instance, one or more registers of the DP83865 may have code or firmware modified or newly written to it that disables the transmit functionality. The function of this firmware is to place the DP83865 into a forced mode of operation (using the DP83865 special "manual" configuration mode). For example, the code or firmware may disable 1000BASET Auto-Negotiation, disable one or more output drivers and configure the DP83865 as a slave device.

In other embodiments, a Phy chip may be obtained that has previously had its front end transmit functionality disabled or removed by hard coding at manufacture time or by other process now known in the art or hereafter developed. The embodiments disclosed herein contemplate other ways of obtaining a Phy chip with no front end transmit functionality.

Method 1100 also includes viewing or monitoring 1104 incoming data frames or packets with the Phy chip. For example, the Phy 330 or 340 that has no front end transmit functionality may receive the separated A or B data from signal separation stage 320 and/or signal separator 310. The Phy 330 or 340 may then view the A or B data.

Method 1110 also includes recognizing 1106 known signal elements with the Phy chip. For example, by knowing that the type of data to lock onto, such as Gigabit Ethernet data, the clock rate is defined, so that performing clock recovery from the receive data stream is possible. Further, it well known that Ethernet data has a known signal packet with known elements such as three idles between data frames. In one embodiment, the PCS (Physical Coding Sublayer) of Phy chip 330 or 340 implemented as the DP83865 chip is configured to view the data steam until it recognizes the Ethernet idle or some other known element. In this way, the Phy chip is able to learn that the received data is an Ethernet signal without having to undergo auto negotiation and to lock onto this signal.

Method 1100 further includes using 1108 the known signal element to at least partially lock onto the data frame or packet. For example, Phy 330 or 340 uses the known signal element such as the Ethernet idle to lock onto the A data stream or the B data stream. The data stream may then be provided by Phys 330 and 340 to Phys 350 and 360, which in turn may provide the signals to external monitoring devices through tap ports 304a and 304b. Note that the amount of time it takes for Phy 330 or 340 to lock onto the signal is not important. As passive fall-duplex bidirectional ZPL network tap 300 is a passive tap, the speed that Phys 330 and 340 lock onto the signal does not effect the operation of the ZPL tap 300. Advantageously, users of network devices A and B do not notice when the listen only Phys 330 and 340 lock onto the data stream. Further, power may be cycled on and off to the listen only Phys without users of network devices A and B knowing and without any data being lost.

VI. Example Methods and Systems

As described herein, the systems of the invention can be used to tap a network cable and access network data. The invention further extends to the use of the systems described herein to access network data, to supply the network data to any associated device, and to process the data. For instance, the passive full-duplex bidirectional ZPL network tap 300 can be used to access Ethernet data being communicated over a copper network cable and to supply the accessed data to a network analyzer device. The network analyzer device can then perform diagnostic functions on the accessed data.

The network analyzer can be a local device that is dedicated for use with a single passive full-duplex bidirectional ZPL network tap 300. Alternately, the network analyzer can be used in conjunction with a plurality of passive full-duplex bidirectional ZPL network taps 300 as will be described below, and can access and analyze or otherwise process the data accessed by any of the associated passive full-duplex bidirectional ZPL network taps 300. The network analyzer can instead be remote and receive the accessed data through a data network.

The data can also be used for any other purpose. For example, the data can be stored and analyzed or processed in a delayed manner. Alternately, the access data can be processed in real time. The invention extends to methods for using the systems described herein to access Ethernet data and to analyze the content, such as the content of data files, telephone conversations carried using Voice over IP (VoIP) or other protocols, images, video, audio, or other data types. It is noted that one of the benefits of the passive full-duplex bidirectional ZPL network taps of the invention is that they are passive and do not affect the data being transmitted over the network except for some slight attenuation thereof. Unlike conventional taps, which use relays with physical switches, the passive full-duplex bidirectional ZPL network taps of the invention do not include any active components positioned in-line with the network cable that could cause data packet loss or otherwise cause users on either end of the network link to be aware of the fact that data is being accessed by a tap. Regardless of loss of power to the tap, there is no loss of communication between the Ethernet devices. This feature is particularly useful for governmental agencies or other entities that are authorized to access network data for the purposes of monitoring and surveillance of communications.

Figure 7:
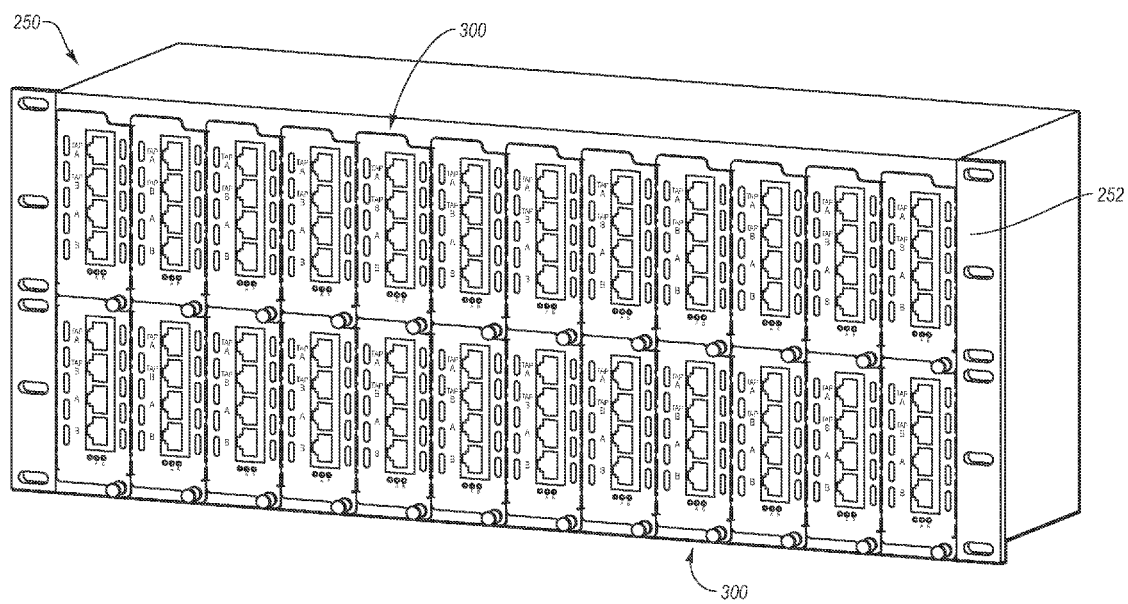
FIG. 7 illustrates a plurality of passive full-duplex bidirectional ZPL network taps housed in a chassis of a tap array.

Reference is now made to FIG. 7. As mentioned, depending upon the needs of the user, the passive full-duplex bidirectional ZPL network tap 300 can be employed alone or, as discussed above in connection with FIG. 2, as part of a larger group of ZPL tap devices. In the event that multiple passive full-duplex bidirectional ZPL network tap devices are employed, those devices are fitted in the chassis 252, which is suitably sized and configured to retain a predetermined number of devices therein. In the example arrangement shown in FIG. 7, twenty four (24) passive full-duplex bidirectional ZPL network tap devices 300 are retained in the chassis 252 of the tap array 250, arranged in two (2) rows of twelve (12) cards each. When thus arranged, the 24 passive full-duplex bidirectional ZPL network tap devices 300 collectively define a chassis form factor having approximate dimensions of about 17" (1U) wide by about 7" (4U) high by about 8" deep. So configured, the ZPL tap array 250 can tap data streams from a variety of points in the computer network 100 and forward these streams to respective monitoring devices for analysis or other treatment.

Figure 8:
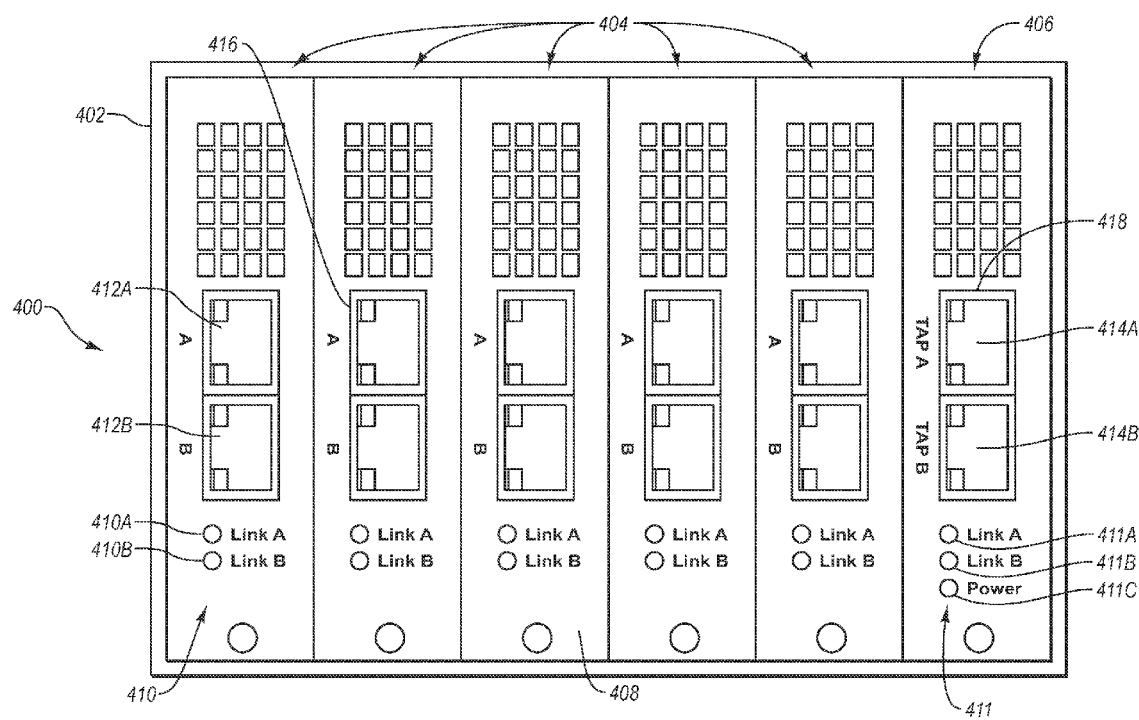
FIG. 8 illustrates a passive full-duplex bidirectional ZPL tap/aggregator.

Reference is now made to FIG. 8. In another example embodiment of the present invention, the network tapping functions of one or more passive full-duplex bidirectional ZPL network taps can be merged with data aggregating functionality provided by an aggregator to enable both data tapping and aggregating in an integrated device. One example of such a device is shown in FIG. 8, which shows a ZPL tap/aggregator ("ZPL T/A"), generally designated at 400. As shown, the ZPL T/A 400 includes a sub-chassis 402 that houses various components, including a plurality of passive full-duplex bidirectional ZPL network tap devices in the form of tap data cards 404, and an aggregator card 406. The ZPL T/A 400 generally functions by tapping data from various points on the network using the plurality of passive full-duplex bidirectional ZPL network tap data cards 404, then aggregating that data via the aggregator card 406 before the data is forward to a monitoring device or other suitable component. Use of the ZPL T/A 400 in this manner simplifies the tapping process and topology by integrating various functionalities into one device.

In a general sense, the ZPL T/A includes within its sub-chassis a number, "X," of ZPL active plug-in data cards that operably connect with the corresponding X-into-1 aggregator plug-in card, where "X" again represents the number of cards in the group of ZPL active data cards. As such, it is appreciated that the number of passive full-duplex bidirectional ZPL network tap data cards that are to be connected to a corresponding aggregator card can be varied. In the example embodiment illustrated in FIG. 8, five (5) tap data cards are connected with a corresponding 5-into-1 aggregator card. This combination therefore provides both passive full-duplex bidirectional ZPL network aggregation and passive full-duplex bidirectional ZPL network TAP capabilities. In other embodiments, multiple passive full-duplex bidirectional ZPL network tap data cards could be included with multiple aggregator cards within a single sub-chassis, wherein some of the tap data cards are assigned to one aggregator and the remaining tap data cards are assigned to the other aggregator card.

In the present embodiment, both the passive full-duplex bidirectional passive full-duplex bidirectional ZPL network tap data cards 404 and the aggregator card 406 have the same form factor. One example form factor for the aforementioned cards is about ⅞ inches wide by 3.5 inches (2U) high by 5.5 inches deep. Of course, other form factors may be defined and employed as well, and the scope of the invention is not limited to any particular form factor or card configuration.

In greater detail, each of the passive full-duplex bidirectional ZPL network tap data cards 404 and aggregator card 406 includes a housing including a housing front face 408. An LED bank 410, including LEDs 410a and b, are included on the front face 408 of each passive full-duplex bidirectional ZPL network tap data card 404 of the ZPL T/A 400. Similarly, the front face 408 of the aggregator card 406 includes an LED bank 411 including LEDs 411a, b, and c. The LED banks 410 and 411 are employed to enable the functionality status of the passive full-duplex bidirectional ZPL network tap data cards 404 and aggregator card 406 to be determined.

Also included on the front faces of 408 of the tap data cards 404 and aggregator card 406 are a plurality of interfaces, or ports, for interfacing with the communications network. In particular, each passive full-duplex bidirectional ZPL network tap data card 404 includes two RJ-45 network ports 412a and 412b on the front face 408, and a dual output backplane connector (not shown) on the rear portion of the card. In an alternative embodiment the rear portion of the card can include two RJ-45 outlet ports. Correspondingly, the aggregator card 406 includes RJ-45 tap ports 414a and 414b on its front face and a backplane connector (not shown) on the rear portion of the card. Note that this combination of interfaces is merely shown as an example, and additional or alternative interfaces may be employed.

The functionality of each passive full-duplex bidirectional ZPL network tap data card 404 is similar to that of the passive full-duplex bidirectional ZPL network tap 300 described above in connection with FIGS. 3 and 4. As such, the network ports 412a, b of each tap data card 404 are operably connected to a node on the communications network by communication cables such that data traversing the network at the node can be input into and output from the tap data card via the network ports. Each passive full-duplex bidirectional ZPL network tap data card 404 can be interconnected with a different node on the network so as to enable data from various points on the network to be tapped.

The backplane connector on the rear portion of each passive full-duplex bidirectional ZPL network tap data card 404 is operably connected to the backplane connector of the aggregator card 406 so as to enable each data stream from each outlet port to be input into the aggregator card. Thus, in the ZPL T/A configuration shown in FIG. 8, the aggregator card 406 is configured to receive data streams from the outlet ports of each of the passive full-duplex bidirectional ZPL network tap data cards 404 via its backplane connector.

Once received by the aggregator card 406, the data streams received from each tap data card outlet port are combined, or aggregated, into two composite data streams that are directed out of the aggregator card 406 via the tap ports 414a, b. These data streams can then be forwarded via communication cables to a monitoring device or other suitable location.

As indicated in FIG. 8, each of the passive full-duplex bidirectional ZPL network tap data cards 404 of the ZPL T/A 400 includes the LED bank 410, including the LEDS 410a and b. Each of the LEDs 410a and b can act as a status indicator, such as a bi-color LED for example, in order to supply a visual status indication with regard to the link connectivity for those cards. The LEDs 410a, b can be used to indicate the link status of each of the passive full-duplex bidirectional ZPL network tap data cards 404. In one embodiment, the LED 410a will light green when the listen only Phy 330 is detecting valid data on network port A, while the LED 410b will light green listen only Phy 340 is detecting valid data on network port B. In addition, the front face 408 of each passive full-duplex bidirectional ZPL network tap data card 404 may include further identifications for each of the network ports 412a and 412b. Note that the labeling present on the front face 408 of the passive full-duplex bidirectional ZPL network tap data cards 404 can be modified according to the different configurations possible with the tap data cards or the aggregator card.

Similar to the passive full-duplex bidirectional ZPL network tap data card 404, the aggregator card 406 also includes indication functionality that enables a user to make various determinations concerning the operation and status of the card. As mentioned, the example embodiment disclosed in FIG. 4 includes an aggregator card having the LED bank 411 including the LEDs 411a, b, and c. The LED 411c lights green when DC power is detected on the DC power port, and lights red or is extinguished, when no DC power is detected on the DC power port. Similar to the tap data cards 404, the LEDs 411a, b of the aggregator card 406 can be used to indicate the link status of the aggregator ports: in one embodiment, the LED 410a will light green if a valid Gigabit Ethernet connection is detected on network port A, while the LED 410b will light green if a valid Gigabit Ethernet connection is detected on network port B.

Figure 12:
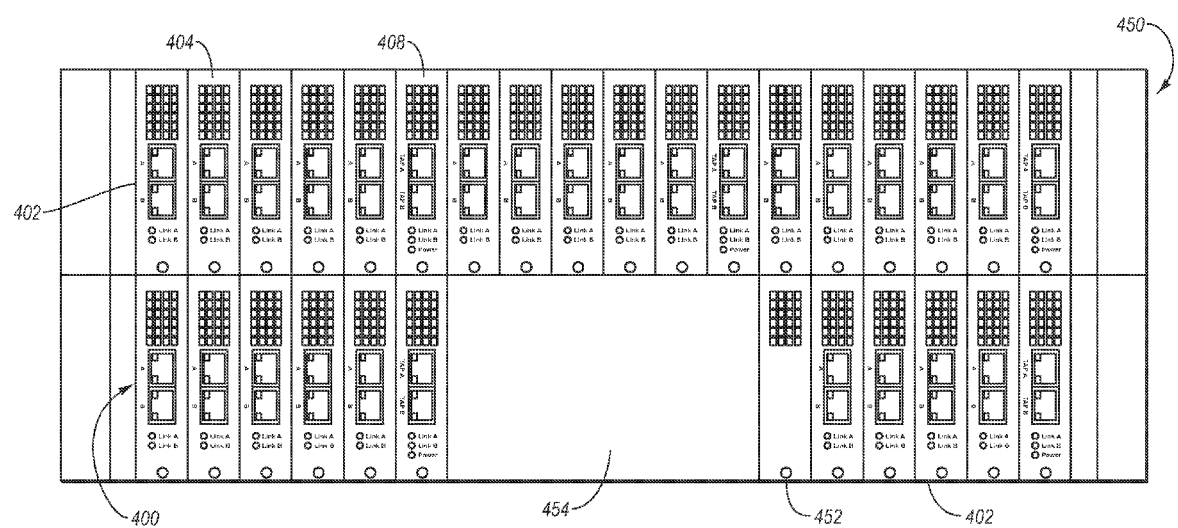
FIG. 12 illustrates an equipment rack in which multiple sub-chassis are combined together.

Together with FIG. 8, reference is now made to FIG. 12. As previously mentioned, the components of the ZPL T/A 400 are included in a housing referred to herein as the sub-chassis 402. In general, the form factor of a particular sub-chassis will depend upon the number of cards that are included in the sub-chassis. As an example, the 5-into-1 tap/aggregator arrangement disclosed in FIG. 9 has a form factor of less than about 7" high by about 5-⅔" wide by about 12" deep.

As suggested above, however, multiple sub-chassis can be combined together in an equipment rack to form or define a chassis, such as the chassis shown in FIG. 9 and generally designated at 450. In the present example embodiment, five sub-chassis 402, each including five passive full-duplex bidirectional ZPL network tap data cards 404 and one aggregator card 406, are combined together in an equipment rack to form the chassis 450 that can provide ZPL data tapping and aggregation for thirty (30) data links. The form factor for the example arrangement of the chassis 450 in FIG. 6 is about 7" high by about 19" wide by about 12" deep. This arrangement generally corresponds with a standard 4U rack mount.

In the example arrangement illustrated in FIG. 12, one of the sub-chassis 402 includes an unutilized link 452, while the chassis 450 itself includes a vacant sub-chassis location 454. These details illustrate that fewer than all of the links in any given sub-chassis, and fewer than all sub-chassis locations may be employed in a particular configuration. Because some or all of the links of any number of sub-chassis can be employed, embodiments of the invention enable virtually unlimited flexibility in terms of the definition and implementation of ZPL tap/aggregation arrangements. Moreover, because data signal transfer between the pluggable cards of the chassis occurs in the chassis backplane, the need to use cables and other connectors in one embodiment is greatly reduced.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A network tap device array, comprising:
a chassis; and
a plurality of network tap devices included in the chassis, at least one of the network tap devices being a passive full-duplex bidirectional Zero Packet Loss (ZPL) tap configured to passively monitor network data,
wherein the at least one passive full-duplex bidirectional ZPL tap comprises:
first and second network ports configured to operably connect with first communication cables, the first communication cables configured to carry full duplex bidirectional data signals comprising first and second signal components to and from the network tap device;
first and second tap ports configured to operably connect with second communication cables;
a signal separator configured to have a first node operably connected to the first network port and a second node operably connected to the second network port, wherein the signal separator is configured to pass through the full duplex bidirectional data signals from the first network port to the second network port and from the second network to the first network port, and wherein the signal separator is further configured to obtain a first signal portion comprising at least first signal component and a second signal portion comprising at least the second signal component;
a first receive only physical interface device (Phy) configured to be operably connected to the signal separator so as to receive the first signal portion from the signal separator;
a first transmit and receive Phy configured to be operably connected to the first receive only Phy so as to receive the first signal portion and provide the first signal portion to the first tap port;
a second receive only Phy configured to be operably connected to the signal separator so as to receive the second signal portion from the signal separator; and
a second transmit and receive Phy configured to be operably connected to the second receive only Phy so as to receive the second signal portion and provide the second signal portion to the second tap port.

2. The network tap device array in accordance with claim 1, wherein the at least one passive full-duplex bidirectional ZPL tap further comprises:
a signal separation stage configured to substantially remove the second signal component from the first signal portion and to substantially remove the first signal component from the second signal portion.

3. The network tap device array in accordance with claim 1, wherein the first and second tap ports are configured to be connected via the second communication cables to a monitoring device for monitoring the first and second signal portions.

4. The network tap device array in accordance with claim 1, wherein the first and second network ports and the first and second tap ports are RJ-45 ports located on the front face of the at least one passive full-duplex bidirectional ZPL tap.

5. The network tap device array in accordance with claim 1, wherein the at least one passive full-duplex bidirectional ZPL tap does not affect data being transmitted over a network coupled to the network tap device array except for normal attenuation.

6. The network tap device array in accordance with claim 1, wherein network communication between network devices coupled to the device array is not lost due to a loss of power or other fault condition to the at least one passive full-duplex bidirectional ZPL tap.

7. The network tap device array in accordance with claim 1, wherein the device array is configured to monitor and analyze the content of data files, telephone conversations carried using Voice over IP (VoIP) or other protocols, images, video, audio, or other data types.

8. A passive full-duplex bidirectional Zero Packet Loss (ZPL) network tap device array for monitoring data transmitted via a communications network, the array comprising:
a chassis; and
a plurality of bidirectional full-duplex passive network tap devices positioned in the chassis, each bidirectional full-duplex passive network tap device including:
first and second network ports configured to operably connect with first communication cables, the first communication cables configured to carry data signals comprising first and second signal components to and from the network tap device;
first and second tap ports configured to operably connect with second communication cables;
a signal separator configured to have a first node operably connected to the first network port and a second node operably connected to the second network port, wherein the signal separator is configured to pass through the full duplex bidirectional data signals from the first network port to the second network port and from the second network to the first network port, and wherein the signal separator is further configured to obtain a first signal portion comprising at least the first signal component; and
a first receive only physical interface device (Phy) configured to be operably connected to the signal separator and to the first tap port so as to receive the first signal portion from the signal separator and provide the first portion to the first tap port.

9. The passive full-duplex bidirectional ZPL network tap device array in accordance with claim 8, wherein the signal separator is further configured to obtain a second signal portion comprising at least the second signal component and wherein each network tap device further includes a second receive only Phy configured to be operably connected to the signal separator and the second network tap port so as to receive the second signal portion from the signal separator and provide the second signal portion to the second tap port.

10. The passive full-duplex bidirectional ZPL network tap device array in accordance with claim 8, wherein each network tap device is configured according to a blade design, and wherein each network tap device includes a front face.

11. The passive full-duplex bidirectional ZPL network tap device array as in accordance with claim 10, wherein the first and second network ports and the first and second tap ports are included on the front face of each network tap device.

12. The passive full-duplex bidirectional ZPL network tap device array in accordance with claim 8, wherein each network tap device includes an LED panel for communicating details regarding the operating condition of the respective network tap device.

13. The passive full-duplex bidirectional ZPL network tap device array in accordance with claim 8 further comprising:
a signal separation stage configured to substantially remove the second signal component from the first signal portion and to substantially remove the first signal component from the second signal portion.

14. The passive full-duplex bidirectional ZPL network tap device array in accordance with claim 8, wherein each network tap device is configured to acceptably operate within a temperature range from approximately zero to 40 degrees Celsius and within a an altitude range from approximately −60 meters to about 3000 meters.

15. The passive full-duplex bidirectional ZPL network tap device array in accordance with claim 8, wherein each network tap device is configured to operate with a range of data rates from approximately 10 Mb per second to at least 1 Gbit per second.

16. The passive full-duplex bidirectional ZPL network tap device array in accordance with claim 8, wherein the chassis is configured to accommodate 24 network tap devices in a 12-by-2 arrangement.

17. The passive full-duplex bidirectional ZPL network tap device array in accordance with claim 8, wherein each network tap device is configured to be hot swapped into and out of the chassis.

18. The passive full-duplex bidirectional ZPL network tap device array in accordance with claim 8, wherein the network tap device array does not affect data being transmitted over a network coupled to the network tap device array except for normal attenuation.

19. The passive full-duplex bidirectional ZPL network tap device array in accordance with claim 8, wherein network communication between network devices coupled to the network tap device array is not lost due to a loss of power or other fault condition to the network tap device array.

20. The passive full-duplex bidirectional ZPL network tap device array in accordance with claim 8, wherein network tap device array is configured to monitor and analyze the content of data files, telephone conversations carried using Voice over IP (VoIP) or other protocols, images, video, audio, or other data types.

21. A network tap/aggregator device array included in a communications network, comprising:
a sub-chassis;
a plurality of network tap devices included in the sub-chassis, each network tap device being a passive full-duplex bidirectional Zero Packet Loss (ZPL) network tap device, each passive full-duplex bidirectional ZPL network tap device capable of outputting a stream of data relating to data transmitted via the communications network; and
at least one aggregator that receives and aggregates the streams of data output from each of the passive full-duplex bidirectional ZPL network tap devices, the at least one aggregator configured to forward the aggregated data to a monitoring device, wherein each passive full-duplex bidirectional ZPL network tap device is operably connected to the aggregator within the sub-chassis via a backplane connector.

22. The network tap/aggregator device array as defined in claim 21, wherein the sub-chassis is capable of receiving passive full-duplex bidirectional ZPL network tap devices and one aggregator.

23. The network tap/aggregator device array as defined in claim 22, wherein multiple sub-chassis are received into a chassis.

24. The network tap/aggregator device array as defined in claim 21, wherein each passive full-duplex bidirectional ZPL network tap device includes two network ports on a front face thereof, and wherein the aggregator includes two tap ports on a front face thereof.

25. The network tap/aggregator device array as defined in claim 21, wherein each of the passive full-duplex bidirectional ZPL network tap devices is capable of being powered by a DC power supply.

* * * * *